US012664557B2

(12) United States Patent

Gerling-Ospina et al.

(10) Patent No.: US 12,664,557 B2

(45) Date of Patent: *Jun. 23, 2026

(54) SYSTEMS AND METHODS FOR PROVIDING NOTIFICATIONS TO DEVICES

(71) Applicant: Capital One Services, LLC, McLean, VA (US)

(72) Inventors: Maria-Andrea Gerling-Ospina, Charlottesville, VA (US); Cara Jo Rawls, Midlothian, VA (US); Troy Friedlander, Washington, DC (US); Naveed Khan, Bowie, MD (US); Victor Raul Lopez Vargas, Washington, DC (US); Beth Shoup, Mechanicsville, VA (US); Michael Keating, Washington, DC (US); Angelina Huynh, Reston, VA (US); Erin Ruppert, Arlington, VA (US); Lingyu Chu, Ashburn, VA (US); DiAndrea Kessee, Hickory Creek, TX (US); Nicole M. Weaver, Chesterfield, VA (US); Jacob Vernon Theodore Yingling, Richmond, VA (US); Joshua Meyer Wilbur, Potomac, MD (US); Narayana Rao Pagolu, Plano, TX (US); Merin J. Samuel, Frisco, TX (US)

(73) Assignee: Capital One Services, LLC, McLean, VA (US)

( * ) Notice: Subject to any disclaimer, the term of this patent is extended or adjusted under 35 U.S.C. 154(b) by 60 days.

This patent is subject to a terminal disclaimer.

(21) Appl. No.: 18/747,438

(22) Filed: Jun. 18, 2024

(65) Prior Publication Data

US 2024/0354770 A1 Oct. 24, 2024

Related U.S. Application Data

(63) Continuation of application No. 17/571,244, filed on Jan. 7, 2022, now Pat. No. 12,051,075, which is a (Continued)

(51) Int. Cl.
| | | |
|---|---|---|
| *G06Q 40/00* | (2023.01) | |
| *G06F 3/04817* | (2022.01) | |

(Continued)

(52) U.S. Cl.
CPC ....... *G06Q 20/425* (2013.01); *G06F 3/04817* (2013.01); *G06F 9/451* (2018.02);

(Continued)

(58) Field of Classification Search
CPC ..................................................... H04L 67/55
See application file for complete search history.

(56) References Cited

U.S. PATENT DOCUMENTS

| | | | | |
|---|---|---|---|---|
| 8,634,810 B2 * | 1/2014 | Barkie | ................ | H04L 12/1859 |
| | | | | 455/412.2 |
| 10,079,903 B1 * | 9/2018 | Cunico | ................. | H04L 67/306 |

(Continued)

FOREIGN PATENT DOCUMENTS

| | | | | | |
|---|---|---|---|---|---|
| TW | 201743203 | * | 6/2017 | ............. | H04L 29/02 |
| WO | WO-2016025944 A1 | * | 2/2016 | ............. | G07F 19/20 |
| WO | WO-2016164706 A1 | * | 10/2016 | ........... | G06Q 20/425 |

OTHER PUBLICATIONS

Anonymous, "Push Notifications: A Checklist for Successful Handling," SFL Newsroom, https://medium.com/sfl-newsroom, 2017 (Year: 2017).*

(Continued)

*Primary Examiner* — Abhishek Vyas
*Assistant Examiner* — William B. Bunker
(74) *Attorney, Agent, or Firm* — Foley & Lardner LLP

(57) ABSTRACT

A system for providing notifications to client devices that includes one or more processors and one or more storage (Continued)

devices. The storage devices may store instructions that, when executed, configure the processors to perform operations. The operations include receiving a transaction notification from a third party; identifying a user account associated with the transaction notification; generating a push notification with a payload describing instructions to display a message and an interactive icon, and a resource identifier associated with the interactive icon, where the resource identifier includes a message ID encoding an interactive session and an action ID encoding a requested action. The operations also include transmitting the push notification to a client device associated with the user account; receiving a first indication indicating a user interaction with the interactive icon, the first indication having the resource identifier and updating the user account based on the action request.

20 Claims, 27 Drawing Sheets

Related U.S. Application Data continuation of application No. 16/693,151, filed on Nov. 22, 2019, now Pat. No. 11,270,314, which is a continuation of application No. 16/401,331, filed on May 2, 2019, now Pat. No. 10,489,789.

(51) Int. Cl.
| | | |
|---|---|---|
| *G06F 9/451* | (2018.01) | |
| *G06Q 20/34* | (2012.01) | |
| *G06Q 20/40* | (2012.01) | |
| *G06Q 20/42* | (2012.01) | |
| *H04L 67/55* | (2022.01) | |

(52) U.S. Cl.
CPC ......... *G06Q 20/354* (2013.01); *G06Q 20/409* (2013.01); *H04L 67/55* (2022.05)

(56) References Cited

U.S. PATENT DOCUMENTS

| | | | | |
|---|---|---|---|---|
| 10,868,711 | B2 * | 12/2020 | Chor .................... | H04L 41/0604 |
| 2014/0032344 | A1 * | 1/2014 | Argue .................. | G06Q 20/047 |
| | | | | 705/17 |
| 2015/0082212 | A1 * | 3/2015 | Sharda .................... | H04L 67/55 |
| | | | | 715/764 |
| 2015/0339656 | A1 * | 11/2015 | Wilson .................... | G06Q 20/12 |
| | | | | 705/44 |
| 2016/0335710 | A1 * | 11/2016 | Piper ....................... | H04W 4/12 |
| 2017/0093779 | A1 * | 3/2017 | Taliaferro ............... | H04L 51/18 |
| 2019/0114645 | A1 * | 4/2019 | Gaitanos ............ | G06Q 20/4012 |
| 2019/0318325 | A1 * | 10/2019 | Kadiwala ............. | G06Q 20/322 |

OTHER PUBLICATIONS

Anonymous, "Managing Your App's Notification Support," developer. apple.com, 2018 (Year: 2018).*

* cited by examiner

900

1000

Receive URI from an Edge Server — 1002

Process Unique ID and Requested Action
Decoding the URI — 1004

Redirect to IMR by Invoking a First API — 1006

IMR Invokes a Second API to Update User
Account Based on the Requested Action — 1008

Invoke a Third API to Dispatch Messages — 1010

Update Log of Requests Based on URI — 1012

1410

1420

1430

1435

1438

1445

1450

1455

1460

1465

1470

Video — 1471(a)
Chat — 1471(b)
Link — 1471(c)
Quote — 1471(d)
Photo — 1471(e)
Text — 1471(f)
X — 1472

1475

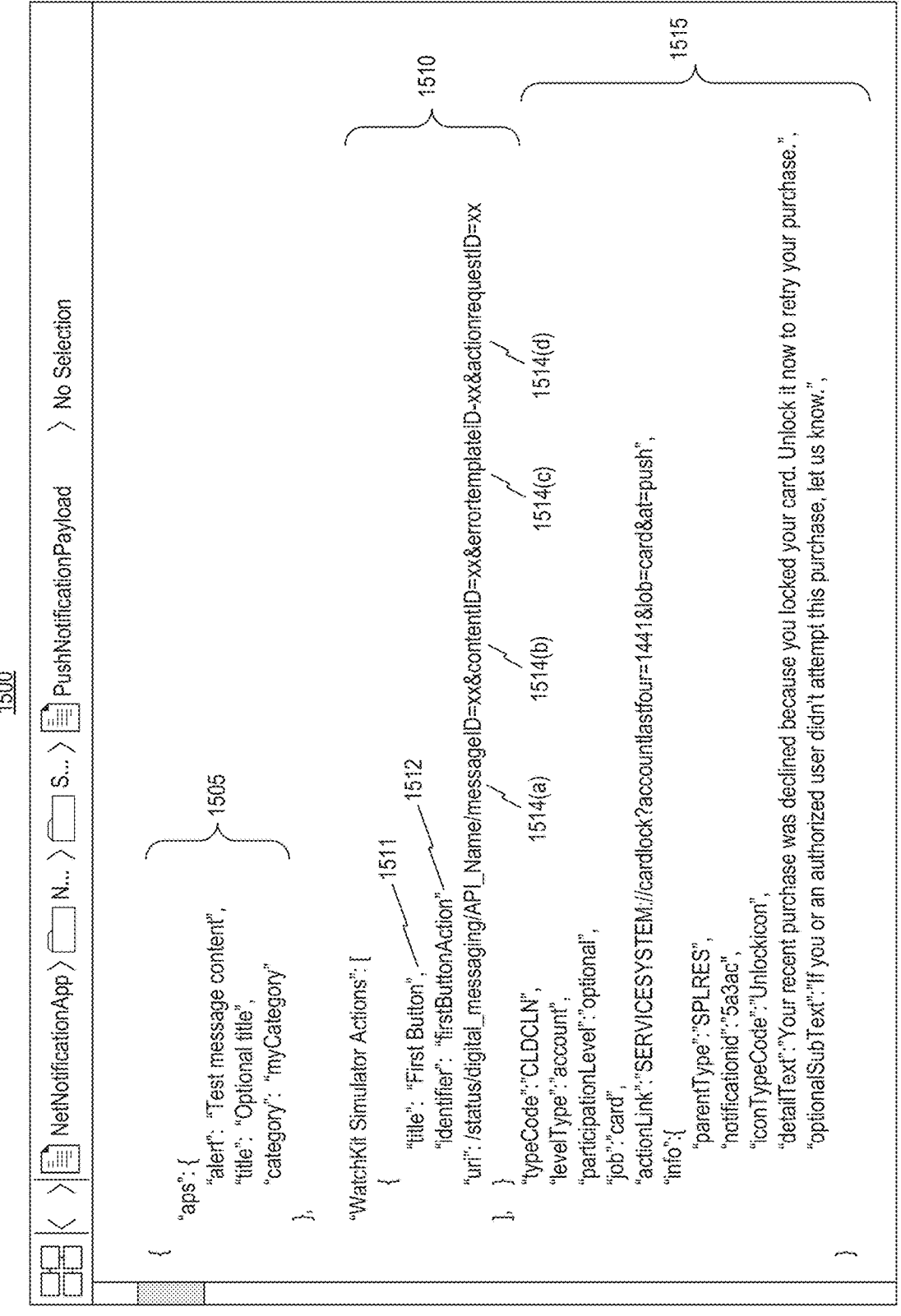

1500

< > | NetNotificationApp > N... > S... > PushNotificationPayload > No Selection

{
"aps": {
  "alert": "Test message content",
  "title": "Optional title",
  "category": "myCategory"                        1505
}, "WatchKit Simulator Actions": [
  {
    "title": "First Button",                      1511
    "identifier": "firstButtonAction",            1512
    "uri": "/status/digital_messaging/API_Name/messageID=xx&contentID=xx&errortemplateID=xx&actionrequestID=xx 1514(a)        1514(b)        1514(c)        1514(d)

"typeCode": "CLDCLN",
    "levelType": "account",
    "participationLevel": "optional",
    "job": "card",
    "actionLink": "SERVICESYSTEM://cardlock?accountlastfour=1441&job=card&at=push",
    "info": {
      "parentType": "SPLRES",
      "notificationid": "5a3ac",
      "iconTypeCode": "Unlockicon",
      "detailText": "Your recent purchase was declined because you locked your card. Unlock it now to retry your purchase.",
      "optionalSubText": "If you or an authorized user didn't attempt this purchase, let us know.",

SYSTEMS AND METHODS FOR PROVIDING NOTIFICATIONS TO DEVICES

CROSS-REFERENCE TO RELATED APPLICATION(S)

This application is a continuation of U.S. patent application Ser. No. 17/571,244, filed on Jan. 7, 2022, which is a continuation of U.S. patent application Ser. No. 16/693,151, filed on Nov. 22, 2019, which is a continuation of and claims priority to U.S. patent application Ser. No. 16/401,331, filed on May 2, 2019. The content of the foregoing applications is incorporated herein in its entirety by reference.

TECHNICAL FIELD

The present disclosure relates generally to systems and methods for providing electronic notifications to client devices, and more particularly, to systems and methods to generate and transmit interactive push notifications for authenticated interactions.

BACKGROUND

Users can access multiple services using mobile devices. For example, through mobile devices users can access entertainment, banking, food delivery, and information services. Accessing these mobile services normally requires some form of user identification and authentication. For example, before a user can access banking information through a mobile device, the user must provide a password and/or other authentication information to confirm the user's identity. This authentication is essential to prevent fraud, protect user's privacy, and provide personalized services.

Although authentication processes are normally not very burdensome, in some situations the additional steps required for authentication may deter access to the mobile services. For example, a user may choose not to use a mobile service because the user forgot authentication credentials, such as the user name and password combination. Further, the user may be unavailable to provide authentication information. For instance, a user wearing gloves may be unable to use fingerprint authentication. These barriers to access the mobile services may dissuade the user from accessing the mobile service and frustrate the user experience.

Authentication barriers to access mobile services are exacerbated in time-sensitive scenarios, in which the user wants to quickly access the mobile service. For example, credit card transactions at a point of sale (POS) are expected to take a few seconds. Therefore, during credit card payments, the additional steps required for authentication frequently deter use of the mobile service. For instance, when a credit card is declined at the POS, the user may desire to access a banking application in a mobile device to resolve the issue. However, the added time and effort required to launch an application, authenticate the user, and then address the problem, can be too troublesome at the POS. Credit card users are accustomed to completing payment transactions within a couple seconds and users may be unwilling to perform all the authentication steps. To the detriment of the credit card issuer's reputation and business, the user, in such situations, may prefer to finalize payment with a different credit card or cash.

The disclosed systems and methods for generating and transmitting interactive push notifications for quick authenticated interactions address one or more of the problems set forth above and/or other problems in the prior art.

SUMMARY

One aspect of the present disclosure is directed to a system for providing notifications to client devices. The system may include one or more processors; and one or more storage devices storing instructions that, when executed, may configure the one or more processors to perform operations. The operations may include receiving a transaction notification from a third party; identifying a user account associated with the transaction notification; generating a push notification with a payload. The payload may include instructions to display a message; instructions to display an interactive icon; and a resource identifier associated with the interactive icon. The resource identifier may include a message ID encoding an interactive session identifier the user account; and an action ID encoding a requested action. The operations may also include transmitting the push notification to a client device associated with the user account; receiving a first indication indicating a user interaction with the interactive icon, the first indication including the resource identifier; and updating the user account based on the action request.

Another aspect of the present disclosure is directed to a non-transitory computer-readable medium storing instructions that, when executed by a processor, perform operations. The operations may include receiving, from a third party, a transaction notification; identifying a user account associated with the transaction notification; generating a push notification with a payload, the payload may include instructions to display a message; instructions to display an interactive icon; and a resource identifier associated with the interactive icon. In some embodiments, the resource identifier may include a message ID encoding an interactive session identifier the user account; and an action ID encoding a requested action. The operations may also include transmitting the push notification to a client device associated with the user account; receiving an indication of a user interaction with the interactive icon, the indication including the resource identifier; and updating the user account based on the action request.

Yet another aspect of the present disclosure is directed to a computer-implemented method for providing notifications to client devices. The method may include: receiving, from a third party, a transaction notification; identifying a user account associated with the transaction notification; generating a push notification with a payload. The payload may include instructions to display a message; instructions to display an interactive icon; and a resource identifier associated with the interactive icon. The resource identifier may include a message ID encoding the user account, an interactive session identifier; and an action ID encoding a requested action. The operations may also include transmitting the push notification to a client device associated with the user account; receiving an indication of a user interaction with the interactive icon, the indication including the resource identifier; and updating the user account based on the action request.

BRIEF DESCRIPTION OF THE DRAWINGS

The accompanying drawings, which are incorporated in and constitute a part of this specification, illustrate disclosed embodiments and, together with the description, serve to explain the disclosed embodiments. In the drawings:

FIG. 15 is a graphical user interface listing exemplary source code for generating a push notification payload, consistent with disclosed embodiments.

DETAILED DESCRIPTION

Figure 1:
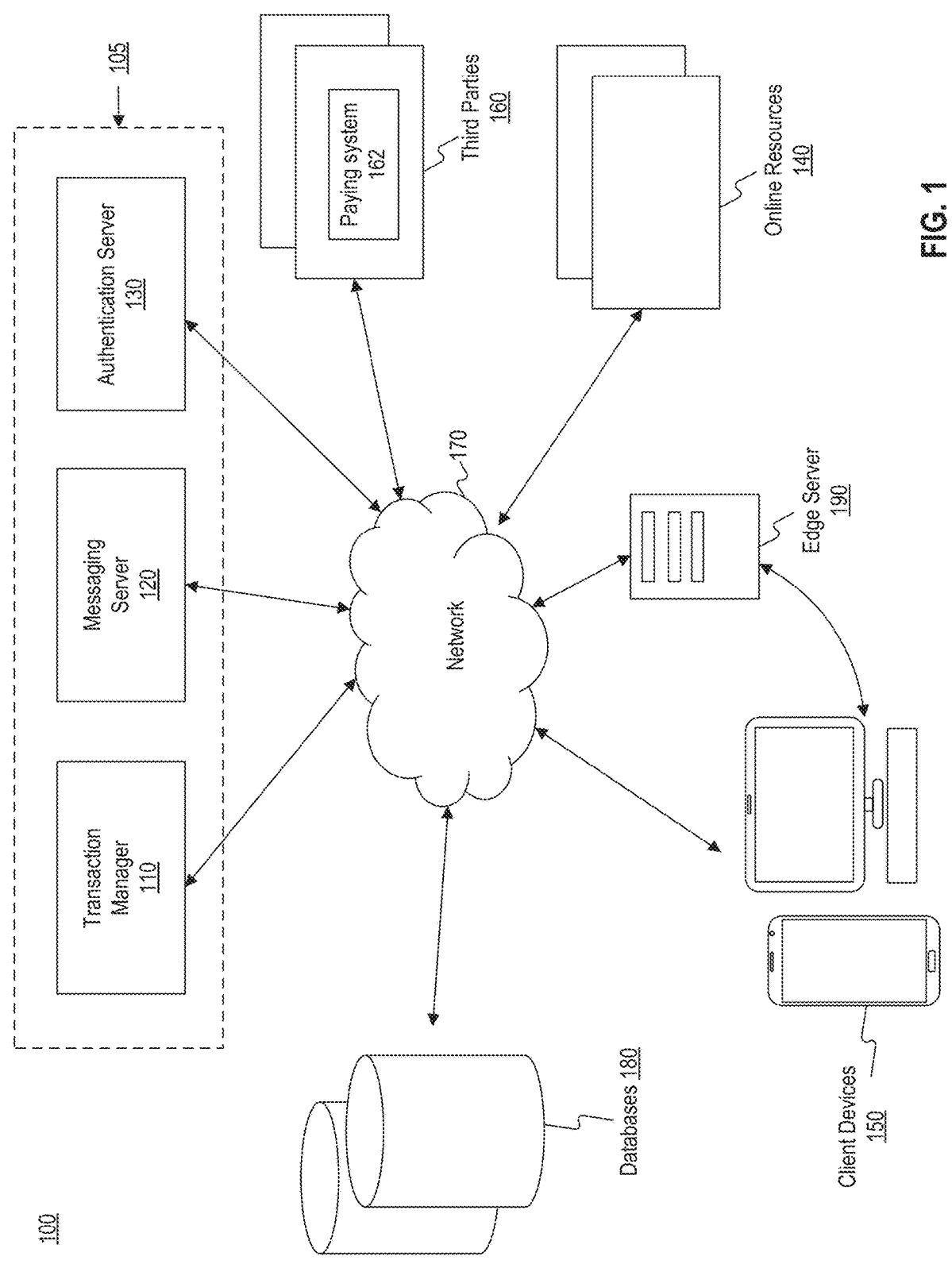
FIG. 1 is a block diagram of an exemplary system, consistent with disclosed embodiments.

The disclosure is generally directed to systems and methods for generating interactive push notifications in mobile devices. The interactive push notifications provide both real-time status of a transaction and interactive elements for potential resolutions. The interactive push notifications improve the user experience by allowing users to transmit authenticated instructions for accessing mobile services without requiring additional burdensome authentication steps. For example, interactive push notifications enable users to directly provide authenticated instructions to a service provider without launching a mobile application. In this way, by embedding the potential resolution in the push notification, the push notification creates a seamless communication channel to resolve issues and/or process transactions.

The interactive push notifications may also improve user response to requests from a service provider, because the interactive push notifications combine interruptions with interactive elements. Unlike other communication channels, such as emails, push notifications effectively direct the attention of the user to time-sensitive situations. For example, the interactive push notifications can generate an alert in the mobile device and automatically display messages and instructions in real time. Moreover, the interactive elements of interactive or enhanced push notifications may provide an effortless path to problem resolution that does not require the user to switch channels or perform multi-step processes. For example, the interactive push notification may be configured to display buttons to provide a one-click response to the service provider. Moreover, while other methods of communication may be vulnerable to malicious attacks (e.g., email notifications are susceptible to phishing attacks), interactive push notifications are less vulnerable to attacks. Thus, users may prefer to interact with interactive push notifications over less secure methods. Further, the limited actions available with push notifications and security features available in notification servers minimizes risks of other hacking attacks and creates a high trust communication channel.

In some embodiments, the disclosed systems and methods may resolve issues of unlocking user accounts through the interactive push notifications. For example, when a user locks a credit card and then tries to use it in a point of sale, interactive push notifications may allow a user to quickly provide instructions for unlocking the credit card. Interactive push notifications may also inform a user of the reason why the credit transaction was declined. In such embodiments, the disclosed systems and methods allow authenticated responses by leveraging device-level authentication to enforce identification requirements, guarantee the validity of the transaction, and prevent fraud. Moreover, the interactive push notifications may be also configured to track user responses, collect data for statistical analysis, and assess user engagement.

The disclosed systems and methods improve the technical field of providing interactive push notifications (also known as enhanced or rich push notifications) to mobile devices by generating notifications with customized payloads. The customized payloads include interactive elements and embed content tailored for an application programing interface (API) that allow for processing user instructions within a single communication channel. Further, the disclosed methods and systems may reduce the computational expenditures during user interactions by reducing the number of exchanges between different elements of the system. In addition, the disclosed systems and methods may improve the operation of the notification system, enabling a better allocation of computing resources and minimizing the processing requirements during user interactions. These features not only result in more efficient systems that improve generation and delivery of interactive notifications, they also enhance user experience and reduce processing requirements in mobile devices.

Reference will now be made in detail to the disclosed embodiments, examples of which are illustrated in the accompanying drawings.

FIG. 1 is a block diagram of an exemplary system 100, consistent with disclosed embodiments. In system 100 a service provider, such as a bank, may interact with clients using multiple communication channels such as push notifications, emails, and short message service (SMS). System 100 may include a service system 105 which may include a transaction manager 110, a messaging server 120, and an authentication server 130. System 100 may additionally include online resources 140, client devices 150, third-party systems 160, databases 180, and an edge server 190. In some embodiments, as shown in FIG. 1, components of system 100 may be connected to a network 170. However, in other embodiments components of system 100 may be connected directly with each other, without network 170. For example, edge server 190 may be directly coupled to client devices 150.

Online resources 140 may include one or more servers or storage services provided by an entity such as a provider of website hosting, networking, cloud, or backup services. In some embodiments, online resources 140 may be associated with hosting services or servers that store user accounts and/or credit card information. In other embodiments, online resources 140 may be associated with a cloud computing service such as Amazon Web Services™. In yet other embodiments, online resources 140 may be associated with a messaging service, such as, for example, Apple Push Notification Service, Azure Mobile Services, or Google Cloud Messaging. In such embodiments, online resources 140 may handle the delivery of messages and notifications related to functions of the disclosed embodiments, such as completion messages and notifications. In such embodiments, online resources 140 may handle the delivery of messages and notifications related to functions of the disclosed embodiments, such as credit card authorization creation, credit card authorization alerts, and/or completion messages and notifications.

Client devices 150 may include one or more computing devices configured to perform one or more operations consistent with disclosed embodiments. For example, client devices 150 may include a desktop computer, a laptop, a server, a mobile device (e.g., tablet, smart phone, etc.), a gaming device, a wearable computing device, or other type of computing device. Client devices 150 may include one or more processors configured to execute software instructions stored in memory, such as memory included in client devices 150, to perform operations to implement the functions described below. Client devices 150 may include software that when executed by a processor performs internet-related communication (e.g., TCP/IP) and content display processes. For instance, client devices 150 may execute browser software that generates and displays interfaces including content on a display device included in, or connected to, client devices 150.

Client devices 150 may execute applications that allow client devices 150 to communicate with components over network 170, and generate and display content in interfaces via display devices included in client devices 150. The display devices may be configured to display graphical user interfaces described in connection with FIGS. 14A-14L. The disclosed embodiments are not limited to any particular configuration of client devices 150. For instance, a client device 150 may be a mobile device that stores and executes mobile applications to perform operations that provide functions offered by service system 105 and/or online resources 140. In certain embodiments, client devices 150 may be configured to execute software instructions relating to location services, such as GPS. For example, client devices 150 may be configured to determine a geographic location and provide location data and time stamp data corresponding to the location data. Client devices 150 are further described in connection with FIG. 6.

Third-party systems 160 may include one or more entities that provide goods, services, and/or information, such as a retailer (e.g., Macy's®, Target®, etc.), a grocery store, an entertainment venue (e.g. cinema, theater, museum, etc.), a service provider (e.g., utility company, etc.), a restaurant, a bar, a non-profit organization (e.g., ACLU™, AARP®, etc.) or other type of entity that provides goods, services, and/or information that consumers (e.g., end-users or other business entities) may purchase, consume, use, etc. Third-party systems 160 are not limited to entities associated with any particular business, specific industry, or distinct field.

Third-party systems 160 may include one or more computing systems, such as servers, that are configured to execute stored software instructions to perform operations associated with a merchant, including one or more processes associated with processing purchase transactions, generating transaction data, generating product data (e.g., stock keeping unit (SKU) data) relating to purchase transactions, etc.

In some embodiments, third-party systems 160 may be brick-and-mortar locations that a consumer may physically visit and purchase goods and services. Such physical locations may include paying system 162, which may include computing devices that perform financial service transactions with consumers (e.g., Point-of-Sale (POS) terminal(s), kiosks, etc.). Paying system 162 may include one or more computing devices configured to perform operations consistent with facilitating purchases at third-party systems 160. Paying system 162 may also include back- and/or front-end computing components that store data and execute software instructions to perform operations consistent with disclosed embodiments, such as computers that are operated by employees of the third-party (e.g., back office systems, etc.).

While paying system 162 is shown within a third-party system 160 in FIG. 1, in some embodiments paying system 162 may be separated from third-party systems 160. For example, paying system 162 may be a different entity that services third-party systems 160. In such embodiments, third-party systems 160 may provide goods and/or services via online solutions. Third-party systems 160 may sell goods via a website to market, sell, and process online transactions. Then, paying system 162 may provide an infrastructure for online payments.

In some embodiments, paying system 162 may include a point-of-sale terminal. In particular, a financial card purchase may be carried out by presenting a financial card at a point-of-sale terminal. Data associated with the financial card may be provided to a payment processor, and the payment processor may process payment the purchase. For example, the payment processor may generate a credit card authorization and include a time stamp and information about the merchant.

For purchases, paying system 162 may collect and/or maintain data identifying the financial card that has been used to make the purchases at a third-party system 160. Additionally, paying system 162 may collect and/or maintain data identifying a user associated with the financial card and/or data identifying a date on which the purchase was made. Paying system 162 may collect and/or maintain other data as well. Data collected and/or maintained by paying system 162 may be provided to databases 180 or service system 105.

In some embodiments, paying system 162 may include a device configured to collect credit card information and issue credit card authorizations. For example, paying system 162 may include a magnetic stripe reader that collects credit card information and connects with a credit card network. In such embodiments, paying system 162 may include software to append information to the credit card authorization or issue new notifications. For example, paying system 162 may include a program to flag a credit card authorization, append a time stamp based on a location code (e.g. Zip Code™, and specify the merchant's address. In some embodiments, to simplify the collection of data, paying system 162 may also be connected to databases 180. In such embodiments, paying system 162 may include a communication device that sends information to service system 105 (e.g., an acquirer bank) and databases 180.

Databases 180 may include one or more computing devices configured with appropriate software to perform operations consistent with providing service system 105, messaging server 120, and authentication server 130 data for performing transactions with client devices 150 and third-party systems 160. Databases 180 may include, for example, Oracle™ databases, Sybase™ databases, or other relational databases or non-relational databases, such as Hadoop™ sequence files, HBase™, or Cassandra™ Databases 180 may include computing components (e.g., database management system, database server, etc.) configured to receive and process requests for data stored in memory devices of the database(s) and to provide data from the database(s).

While databases 180 are shown separately, in some embodiments databases 180 may be included in, or otherwise related to, one or more of service system 105, transaction manager 110, messaging server 120, authentication server 130, and online resources 140.

Databases 180 may be configured to collect and/or maintain the data associated with user accounts and user preferences. Databases 180 may collect the data from a variety of sources, including, for instance, online resources 140. Databases 180 are further described below in connection with FIG. 5.

Transaction manager 110 may include one or more computing systems configured to perform operations consistent with handling transaction requests from client devices 150 and third-party systems 160. In some embodiments, transaction manager 110 may receive requests to execute a transaction from a third party, perform operations to determine the transaction may be authorized (e.g., determine if an account has sufficient funds), and communicate authorizations to third-party systems 160 and/or client devices 150. In some embodiments, transaction manager 110 may provide infrastructure and components to access financial service accounts such as credit card accounts, checking accounts, debit card accounts, loyalty or reward programs, lines of credit, and the like. In such embodiments, transaction manager 110 may authorize or decline credit card authorization requests and may issue authorization codes. Further, transaction manager 110 may include databases that store user accounts and link them to user preferences or settings to decide whether or not authorizing a transaction.

In some embodiments, as a response to transaction notifications from third-party systems 160 or client devices 150, transaction manager 110 may correlate information in the transaction notification with a user account. Having identified a user account based on information from the transaction, transaction manager 110 may determine type of actions available to respond. For example, when transaction manager 110 receives a transaction notification indicating that a user is attempting to use a blocked credit card, transaction manager 110 may correlate the transaction notification with a user account to determine if the user has enrolled in push notification, email, or SMS messages to notify of the decline notice.

Messaging server 120 may include one or more computing systems configured to generate and transmit notifications to client devices 150. For example, messaging server 120 may include computing systems to encode messages and interact with messaging servers, such as Apple Push Notification Service (APNS) or Google Cloud Messaging (GCM). For example, in some embodiments messaging server 120 may include processors to encode a message based on instructions received from transaction manger 110. The message may be configured as a push notification, as an email, or as an SMS. Depending on the type of message that is generated, messaging server 120 may then elect a communication path to transmit the messages.

In some embodiments, messaging server 120 may also be configured to receive messages from other elements of system 100. For example, messaging server 120 may be configured to receive and interpret messages from edge server 190. Further, messaging server 120 may include middleware programs that handle communications from other elements of system 100 using a messaging API. In such embodiments, messaging server 120 may implement queue and prioritization programs to process or deliver messages. Further, messaging server 120 may be configured to save messages, generate records, or respond with acknowledgement messages for different communication protocols. For example, messaging server 120 may be configurable to communicate with other elements of system 100 using cellular networks using standards such as Long-Term Evolution (LTE) and Global System for Mobile communications (GSM). In addition, server 120 may also implement communication protocols such as TCP/IP (Transmission Control Protocol/Internet Protocol), ARP (Address Resolution Protocol), DHCP (Dynamic Host Configuration Protocol), DNS (Domain Name System), and FTP (File Transfer Protocol), among others, to interact with other elements of system 100.

Messaging sever 120 may be organized as a point-to-point messaging. Alternatively, or additionally, messaging server 120 may be configured as a subscribe/publish messaging server. In both embodiments, nonetheless, messaging server 120 may include processors to encode and decode data to generate Uniform Resource Identifiers (URIs). For example, messaging server 120 may generate URIs by producing standardized file paths, and encode data files in standard formats, such as base64. In such embodiments, messaging server 120 may configure the URI as CSS files to reduce the number of HTTP requests for the external resources. URIs generated by messaging server may include parameters such as an API version, an account name, a client ID, an action ID, and/or a subscription ID. For example, messaging sever 120 may be configured to encode in the URI a unique ID that includes interactive session identification and a request or action ID, which may specify available actions as determined by, for example, transaction manager 110.

Messaging server 120 may be configured to communicate with other elements of system 100 by invoking specified APIs. For example, messaging server may communicate with notification services, such as APNS, using a dispatching API. In such embodiments, messaging server 120 may use the dispatching API to construct a JavaScript Object Notation (JSON) dictionary containing the notification's payload, generate a unique device token, and other delivery information in an HTTP request. Moreover, messaging server 120 may be configurable to invoke decoding APIs that interpret messages from other elements of system 100. For example, messaging server 120 may be configurable to handle HTTP GET and/or PUT requests.

Moreover, messaging server 120 may handle exchanges for secure communication with services such as GCM. For example, messaging server may handle token-based provider connection and use an HTTP/2-based API to generate web tokens and provide validation credentials for connection with broadcasting or dispatching servers. In such embodiments, messaging server 120 may generate and control public keys and a private keys for exchanges with authentication or notification servers. Further, messaging server 120 may provide push notification requests and receive results as an HTTP response. In some embodiments, the response may include details on success or failure of delivery. In other embodiments, messaging sever 120 may establish secure communication pathways with notification service providers. For example, messaging server 120 may employ a unique provider certificate and private cryptographic key. In such embodiments, messaging server 120 may receive a provider certificate that may establish a push notification service identification. Messaging server 120 is further described below in connection with FIG. 3.

Authentication server 130 may include one or more computing systems that perform operations to authenticate client devices 150, users of client devices 150, and/or third-party systems 160. For example, authentication server 130 may be implemented with a computer framework having a processor that determines if credentials produced by client devices 150 are valid. Further, authentication server 130 may also be programed to identify fraudulent transactions and generate further alerts that may be communicated to other elements of system 100. For example, authentication server 130 may identify repeated authentication attempts for a user account and transmit an alert message to transaction manager 110.

In some embodiments, authentication server 130 may be implemented as a dedicated computer. In other embodiments, authentication server 130 may be part of an ethernet switch, an access point, a network access server, or combinations thereof. Authentication server 130 may receive access requests from client devices 150 and grant access based on a username and password match or other identifying information, such as biometric information. In some embodiments, authentication server 130 may employ encrypted systems such as Kerberos. Alternatively, or additionally, authentication server 130 may use security tokens that can be used for specified operations. In such embodiments, authentication server 130 may utilize tokens associated with client devices 150 to grant different levels of access to a user account. For example, authentication server 130 may grant one token to access information about the reason for declining a credit card transaction, issue a different token to grant write changes for unlocking the credit card, and issue a different token to communicate an approval to third-party systems 160. Authentication server 130 may communicate with other elements of system 100 using User Datagram Protocol (UDP) channels employing methods such as RADIUS (Remote Authentication Dial-In User Service). Alternatively, or additionally, authentication server 130 may employ TCP/IP communications in methods such as TACACS+ (Terminal Access Controller Access Control System Plus). Further, in some embodiments authentication server 130 may determine whether a device-based authentication was performed. Alternatively, or additionally, authentication server 130 may authenticate a device using device information. For example, authentication server 130 may use MAC or IP addresses to authenticate client devices 150 and/or third-party systems 160, without the need of exchanging passwords and authentication requests. Moreover, authentication server 130 may use smart cards or biometric verification in addition to one or more of the above mentioned technologies.

FIG. 1 shows transaction manager 110, messaging server 120, and authentication server 130 as different components of service system 105. However, transaction manager 110, messaging server 120, and authentication server 130 may be implemented in the same computing system. For example, all elements in service system 105 may be embodied in a single server.

Edge server 190 may include one or more computing systems that perform operations to relay communications between networks associated with system 100. For example, edge server 190 may be coupled between local networks of system 100, or between a private network of service system 105 and a general and public cellular network. In some embodiments, as shown in FIG. 1, edge server 190 may be located close to client devices to minimize lag time between interactions. Further, edge server 190 may be programed to resolve acknowledgement responses or perform basic authentication tasks after receiving responses from client devices 150.

In some embodiments, edge server 190 may implement a firewall that monitors traffic coming in from client devices 150 or third-party systems 160, and identify any dangerous or suspicious behavior to block response. For example, edge server 190 may identify responses with tampered URIs and block those responses to prevent unintended or fraudulent unlocking requests. Further, edge server 190 may perform Domain Name System (DNS) functions and manage communication gateways to balance front end web servers and the back end data. Moreover, edge server 190 may perform gateway functions and forward incoming messages to the internal/private servers. For example edge server 190 may be configured to invoke APIs and interact with transaction manager 110. In addition, edge server 190 may be part of a Content Distribution Network (CDN) and store static content and replicate other server functions but being closer to the end user to minimize processing times. Edge server 190 is further described in connection with FIG. 7.

Network 170 may be any type of network configured to provide communications between components of system 100. For example, network 170 may be any type of network (including infrastructure) that provides communications, exchanges information, and/or facilitates the exchange of information, such as the Internet, a Local Area Network, near field communication (NFC), optical code scanner, or other suitable connection(s) that enables the sending and receiving of information between the components of system 100. In other embodiments, one or more components of system 100 may communicate directly through a dedicated communication link(s).

It is to be understood that the configuration and boundaries of the functional building blocks of system 100 have been defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope and spirit of the disclosed embodiments.

Figure 2:
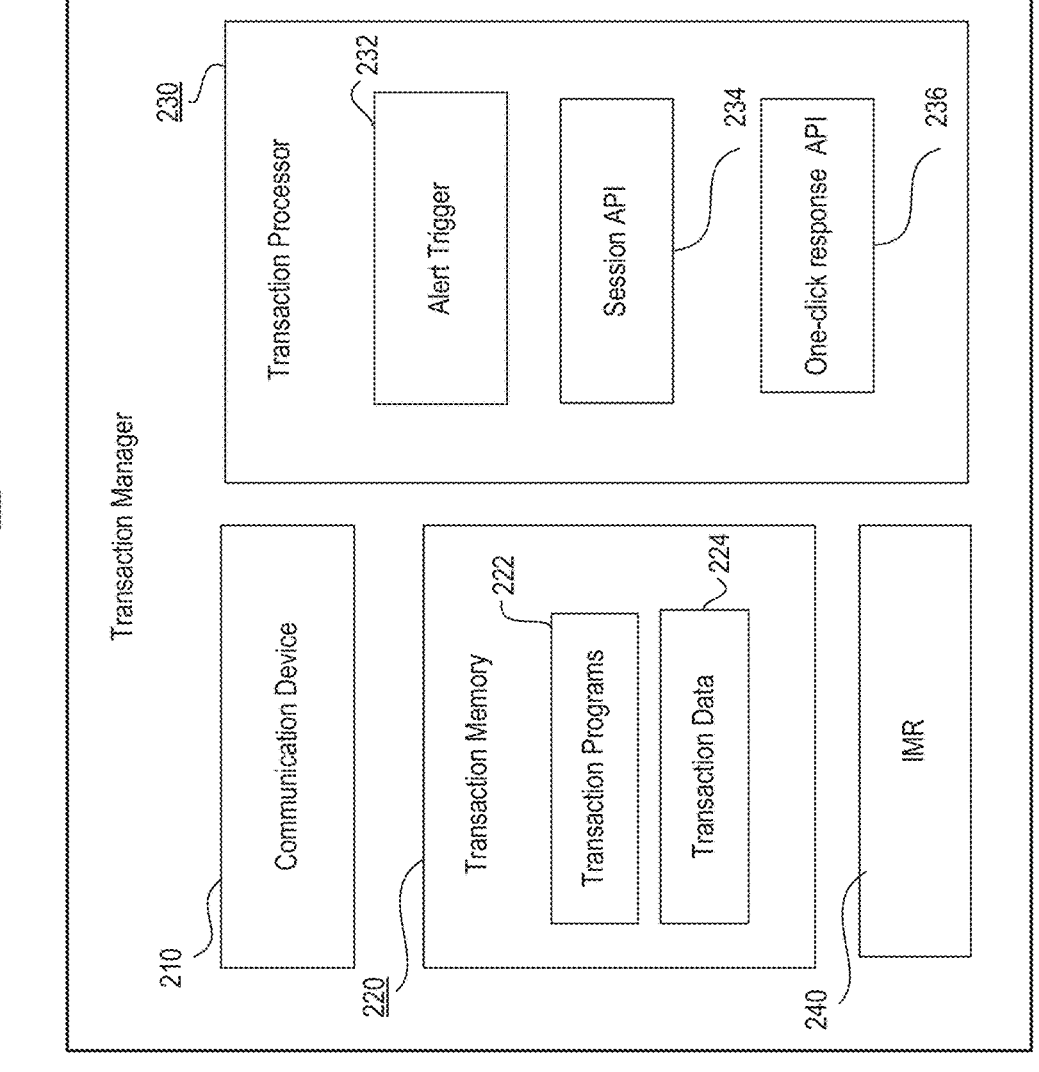
FIG. 2 is a block diagram of an exemplary transaction manager, consistent with disclosed embodiments.

FIG. 2 shows a block diagram of an exemplary transaction manager 110 (FIG. 1), consistent with disclosed embodiments. Transaction manager 110 may include a communication device 210, a transaction memory 220, and one or more transaction processors 230, and an implementation repository (IMR) 240. Transaction memory 220 may include transaction programs 222 and transaction data 224. Transaction processors 230 may include an alert trigger module 232, a session API module 234, and a one-click response API 236.

In some embodiments, transaction manager 110 may take the form of a server, a general purpose computer, a mainframe computer, or any combination of these components. In other embodiments, transaction manager 110 may be a virtual machine. Other implementations consistent with disclosed embodiments are possible as well.

Communication device 210 may be configured to communicate with one or more databases, such as databases 180 described above, either directly or via network 170. In particular, communication device 210 may be configured to receive user account information from databases 180 to determine whether or not to process a transaction. In addition, communication device 210 may be configured to communicate with other components as well, including, for example, messaging server 120 and authentication server 130. For example, messaging server 120 may communicate a client response to transaction manager 110, or transaction manager 110 may communicate available actions to messaging server 120 to generate push notifications, emails, or SMS.

Communication device 210 may include, for example, one or more digital and/or analog devices that allow communication device 210 to communicate with and/or detect other components, such as a network controller and/or wireless adaptor for communicating over the Internet. Other implementations consistent with disclosed embodiments are possible as well.

Transaction memory 220 may include one or more storage devices configured to store instructions used by transaction processors 230 to perform functions related to disclosed embodiments. For example, transaction memory 220 may store software instructions, such as transaction programs 222, that may perform operations when executed by transaction processors 230. The disclosed embodiments are not limited to separate programs or computers configured to perform dedicated tasks. For example, transaction memory 220 may include a single transaction program 222 that performs the functions of transaction manager 110, or transaction program 222 may include multiple programs. Transaction memory 220 may also store transaction data 224 that is used by transaction program 222. For example, transaction data 224 may include logs of transaction notifications from third-party systems 160 and transaction processors 230 may use this information to determine whether or not to execute the transaction.

In certain embodiments, transaction memory 220 may store sets of instructions for carrying out processes to determine whether a transaction should be processed, identify locked accounts, and/or interact with user accounts. In certain embodiments, transaction memory 220 may store sets of instructions for requesting information from a financial service and request authorizations for processing transactions. Other instructions are possible as well. In general, instructions may be executed by transaction processors 230 to perform processes consistent with disclosed embodiments.

In some embodiments, transaction processors 230 may include one or more known processing devices, such as, but not limited to, microprocessors from the Pentium™ or Xeon™ family manufactured by Intel™, the Turion™ family manufactured by AMD™, or any of various processors from other manufacturers. However, in other embodiments, transaction processors 230 may be a plurality of devices coupled and configured to perform functions consistent with the disclosure. For example, transaction processors 230 may include a plurality of co-processors, each configured to run specific transaction manager 110 operations such as floating point arithmetic, graphics, signal processing, string processing, cryptography or I/O interfacing.

In some embodiments, transaction processors 230 may execute software to perform functions associated with each component of transaction processors 230. In other embodiments, each component of transaction processors 230 may be an independent device. In such embodiments, each component may be a hardware device configured to specifically process data or perform operations of processing transactions. For example, alert trigger module 232 may be a field-programmable gate array (FPGA), while session API module 234 may be a central processing unit (CPU). Other hardware combinations are also possible. In yet other embodiments, combinations of hardware and software may be used to implement transaction processors 230.

Alert trigger module 232 may process transaction notifications to determine whether an alert should be generated. For example, communication device 210 may receive a transaction notification from one of third-party systems 160. Alert trigger module 232 may identify inconsistencies with the transaction notification and generate an alert for the system to prevent the transaction or request an authorization. For example, alert trigger module 232 may generate an alert when the transaction notification is from unexpected foreign country. Alternatively, or additionally, alert trigger module 232 may generate an alert when a credit card associated with the transaction is locked, inactive, or it has insufficient funds/credit. In such embodiments, alert trigger module 232 may fetch user information to make those determinations. For example, alert trigger module 232 may identify user(s) associated with the received transaction notification and request user information from transaction data 224. In some embodiments, alert trigger module 232 may be generated using SQL alert functions based on an application log. For example, alert trigger module 232 may employ a SQL server agent that reads the application log and compares events written there to defined alerts. In such embodiments, when SQL server agent finds a match, the agent may fire an alert automatically. Further, alert trigger module 232 may monitor performance conditions of transactions processors 230.

In some embodiments, transaction processors 230 may implement alert trigger module 232 by executing instructions to create an application in which transaction notifications are processed. In other embodiments, however, alert trigger module 232 may be a separate hardware device or group of devices configured to carry out operations. For example, to improve performance and speed of the transaction notification processing, alert trigger module 232 may be an SRAM-based FPGA that functions as alert bigger module 232. Further, alert trigger module 232 may have an architecture designed for implementation of specific algorithms. In such embodiments, alert trigger module 232 may include a Simple Risc Computer (SRC) architecture or other reconfigurable computing system.

Session API module 234 may include a set of functions that generate core sessions workings, allowing data to be stored and associated with a user account. Session API module 234 may create user sessions with banking systems using defined realms, such as Lightweight Directory Access (LDAP). In such embodiments, session API module 234 may save session information with cookies files that can be re-used for subsequent requests. In some embodiments, session API module 234 may be configured to time out after a predetermined number of minutes of no activity. Alternatively, session API module 234 may be configured to time out after more hours or after receiving a subsequent response. For example, transaction processors 230 may be configured to disconnect after eight hours or when third-party systems 160 transmit a confirmation.

In some embodiments, session API module 234 may generate requests by configuring directory paths such as "/api/session?realmName=<realmName>," where the query parameter realmName takes as its value the name of a realm to authenticate against. In such embodiments, session API module 234 may return a cookie ID in the HTTP response header. Session API module 234 may also store the cookie ID and the HTTP response in a file to be used in subsequent requests.

In some embodiments, based on the indication of an event from alert trigger module 232, session API module 234 may establish sessions to access user-specific information associated with a user account. For example, session API module 234 may communicate with databases 180 using an implementation repository (IMR) 240 to request user-specific information associated with a user account.

One-click response API 236 may include a set of instructions for providing one-click access to a customized user interaction-specific web page associated with a user account. One-click response API 236 may use a unique identifier associated with an interactive session and generate a web URL for the one click interaction. In such embodiments, one-click response API 236 may generate a customized user interaction-specific web page. For example, in some embodiments, once an alert is generated by alert trigger module 232 and a session established by session API module 234, one-click response API 236 may be used to request changes in a user account or provide instructions on how to resolve issues. Moreover, in some embodiments, the unique ID may be related to an opened interactive session.

In some embodiments, one-click response API 236 may be configured to decode URIs to identify message, content, error templates, and action request. For example, from an URI, one-click response API 236 may be configured to identify a user identification and a request for updating the user account. In such embodiments, one-click response API 236 may identify a credit card number, associate it with a user account, and identify a request to unlock the credit from a URI. One-click response API 236 may also be used to communicate with other elements of system 100, to update the user account and authorize or decline transactions, and/or activate credit cards.

In some embodiments, one-click response API 236 may generate scripts to execute the actions identified from the URI. For example, one-click response API 236 may configure scripts such as:

```
<script type="application/Id+json">
{
    "@context: "http://schema.org",
    "@type": "EmailMessage",
    "potentialAction": {
    @type": "HttpActionHandler",
    "address": ActionAddress
    }
    "description": "$descript"
}</script>
```

Alternatively, or additionally, one-click response API 236 may generate microdata routines to execute instructions from URI. For example, one-click response API 236 may configure actions based on an action ID from the URI by generating template instructions such as:

```
<div itemscope itemtype="http://schema.org/Message">
 <div temprop="potentialAction" itemscope
itemtype="http://schema.org/ConfirmAction">
    <meta itemprop="name" content="Approve Expense"/>
    <div temprop="handler" itemscope
itemtype="http://schema.org/HttpActionHandler">
    <link itemprop= action address/>
 </div>
```

In some embodiments, one-click response API 236 may use communication device 210 to transmit instructions to other elements of system 100. In other embodiments, however, one-click response API 236 may execute instructions to perform peer-to-peer communication without routing it through communication device 210.

One-click response API 236 may be implemented by transaction processors 230. For example, transaction processors 230 may execute software to create an environment to execute the one-click operations. However, in other embodiments, one-click response API 236 may be performed by hardware devices configured to carry out parallel operations. Some hardware configurations may improve the efficiency of the interactions between transaction manager 110 and other elements of system 100, particularly when multiple transactions are being processed in parallel. For example, one-click response API 236 may call multicore processors or computer clusters to divide tasks and quickly process transactions.

IMR 240 may include processors and/or storage devices that maintain a server table to keep track of pending processes. Alternatively, or additionally, IMR 240 may run on an embedded device and may record server details in non-volatile RAM. IMR 240 may control a registry of known servers, records which server is currently running on which host and at which port number. IMR 240 may also start servers on demand if they are registered to do so. In some embodiments, IMR 240 may manage the work flow between servers by creating a persistent reference, set the address and port number in the profile body of the Interoperable Object Reference (IOR), which may uniquely identify an object on a remote server, and implement a repository that is responsible for the server. In such embodiments, when a client uses an IOR, IMR 240 may connect the client to the implementation repository, provided the implementation repository is not down. Further, IMR 240 may be configured to decode IORs and use a Portable Object Adapter (POA) name from the object key to index into the server table. The repository replies with the current addressing information of the actual server.

In some embodiments, IMR 240 may store the information about each server application. For example, for each server application, IMR 240 may store a logical name that uniquely identifies a server (e.g., "BankSrv" or "StockControlSrv"), a command that IMR 240 can execute to (re) start the server process, and status information that indicates whether or not the server is currently running. With this diversified configuration of server processes, IMR 240 may be configured to start and stop a server process, record details of servers (such as the command used to launch a server), and determine whether or not the server is currently running. In some embodiments, IMR 240 may store this information in transaction memory 220 and/or database 180. Alternatively, or addition, IMR 240 may record this information in a textual file.

The components of transaction manager 110 may be implemented in hardware, software, or a combination of both. For example, although one or more components of transaction manager 110 may be implemented as computer processing instructions embodied in computer software, all or a portion of the functionality of transaction manager 110 may be implemented in dedicated hardware. For instance, groups of GPUs and/or FPGAs may be used to quickly analyze data in transaction processors 230.

Figure 3:
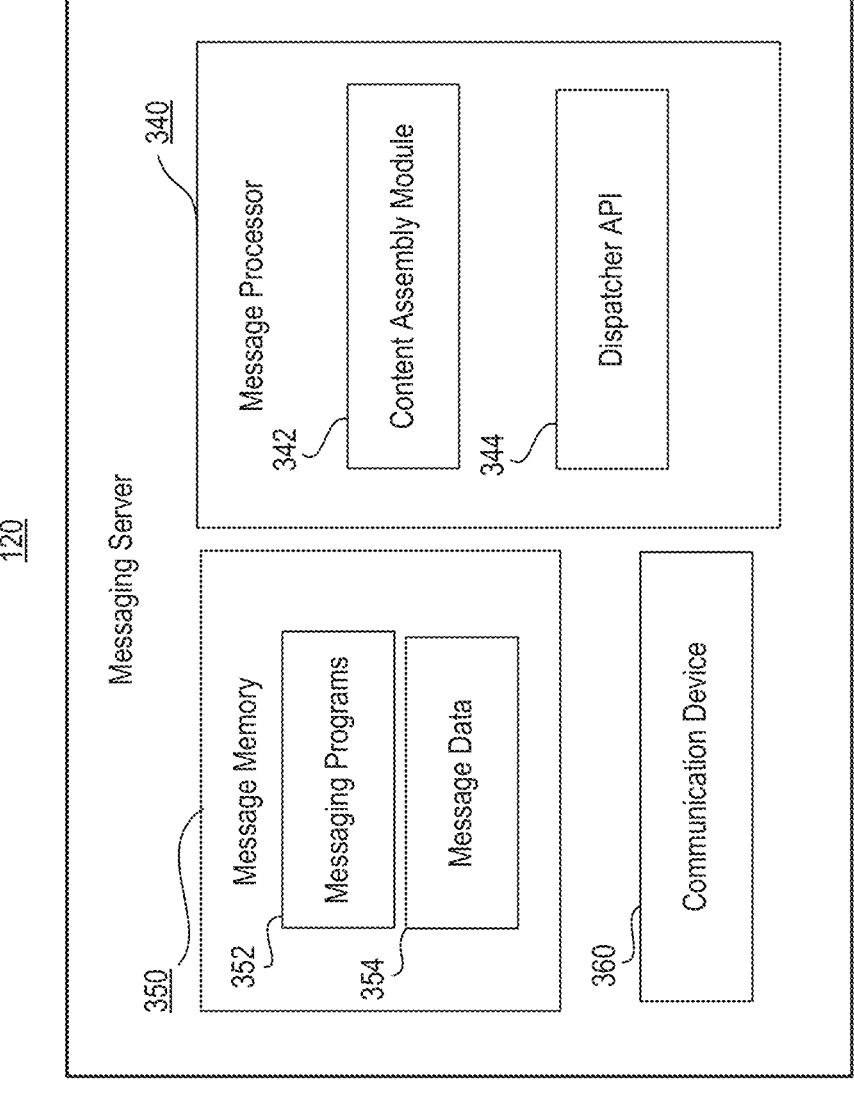
FIG. 3 is a block diagram of an exemplary messaging server, consistent with disclosed embodiments.

Referring now to FIG. 3, there is shown a block diagram of an exemplary messaging server 120 (FIG. 1), consistent with disclosed embodiments. Messaging server 120 may include a message processor 340, a message memory 350, and a communication device 360.

Message processor 340 may be embodied as a processor similar to transaction processors 230. Message processor may include a content assembly module 342 and a dispatcher API 344.

Content assembly module 342 may generate a message for transmission to client devices 150. In some embodiments, content assembly module 342 may generate interactive or enhanced push notifications for client devices 150. For example, based on determinations of transaction manger 110 and an identified user, content assembly module 342 badge an app icon. Alternatively, or additionally, content assembly module 342 may include keys for silent notifications.

In some embodiments, content assembly module 342 may include custom 'keys' within the payload to deliver data to client devices, notify service app extensions, or notify content app extension. In such embodiments, custom keys in content assembly module 342 may have values with primitive types, such as dictionary, array, string, number, or Boolean. Custom keys may be placed in, for example, the "userinfo" dictionary of an "UNNotificationContent" object delivered to client devices 150. Content assembly module 342 may generate identifier strings that encode app-specific data. For example, content assembly module 342 may generate a URI that encodes a message, a requested action, and an identifier for an interactive session with, for example, IMR 240.

In some embodiments, the interactive session may be established to provide communication between service system 105, client devices 150, and third parties 160. For example, the interactive session may open communication ports for TCP/IP. In some embodiments, the interactive session may include an activity log configured to store communications and data to and from the user device in association with a subject of the notification. In such embodiments, the activity log may be stored in databases 180.

Moreover, establishing an interactive session may include permitting the client of the communication to log into the system. For example, the client may present identification credentials. The type of credentials may depend on the operating system. In some embodiments, credentials may include username and a text password. Alternatively, or additionally, the authentication to establish an interactive session between service system 105 and other elements of system 100 may include Kerberos, SSH, or security certificates.

In some embodiments, establishing an interactive session may include defining parameters and headers such as determining {cluster-endpoint} with the URL of the cluster's management endpoint and {session-id} with the session id returned on session startup, setting the content-type header to application/json, and authenticating with the endpoint using HTTP basic authentication. An example of creating an interactive session, which may later be codified with a unique ID, is:

```
"kind" : "spark",
"jars" : ["wasb://<BlobStorageContainerName>@<StorageAccountName>. "],
"files" : ["wasb://<BlobStorageContainerName>@<StorageAccountName>. "],
"driverMemory" : "1G",
"driverCores" : 2,
"executorMemory" : "1G",
"executorCores" : 10,
"numExecutors" : 10.
``` may retrieve a message template including, for example, a header and a payload, and populate the template with the specific information for a selected action and a selected user. For example, content assembly module 342 may be configured to populate the payload for a notification using a JSON dictionary. In such embodiments, content assembly module 342 may retrieve applications whose value is a dictionary containing one or more additional defined keys. Further, content assembly module 342 may include keys for instructing client devices 150 to display an alert, play a sound, or Content assembly module 342 may then add the formed string to a message payload. Further, content assembly module 342 may categorize messages that identify the notification's type, and add action buttons to the alert. For example, content assembly module 342 may generate messages with a play action to start a request using a custom action ID. The custom action ID may contain an identifier that the mobile app can use to request user interaction and perform instructions related to the user account. Additional elements of messages generated by content assembly module 342 are described in connection with FIG. 15.

In some embodiments content assembly module 342 may be configured to generate, in a first instance, push notification messages. Then, if the push notification is unsuccessful, content assembly module 342 may generate an SMS and/or an email message, which includes similar information as the push notification. For example, if client devices 150 cannot receive push notifications because they do not have notification features activated, content assembly module 342 may be instructed to generate SMS and/or email messages with similar information. In other embodiments, however, content assembly module 342 may be configured to generate the push notification concurrently with SMS and an email. For example, content assembly module 342 may generate a URI encoding a unique ID and action ID, and then generate a push notification payload, an email, and an SMS that includes the URI. In such embodiments, content assembly module 342 invoke email APIs that manage rich content and handle volume requests. Further, content assembly module 342 may also store and encode infrastructure rules, such as various internet service providers requirements.

Dispatcher API 344 may interface with communication services such as APNS or GCM. Further, dispatcher API 344 may offer automation of creating contacts, sending SMS messages, and/or emails. Dispatcher API may generate JSON files for these various events, and may include some automated responses to transmit generated messages by, for example, content assembly module 342. In some embodiments, dispatcher API 344 may create persistent socket connections with notification services. The socket connections may be tuned using a Java Naming and Directory Interface (JNDI) property such as "push.apns.connections." In some embodiments, dispatcher API 344 may be configured to close sockets if there is an extended idle time using instructions such as "push.apns.connectionIdleTimeout."

Dispatcher API 344 may also manage interaction with firewalls from notification services. For example, after receiving a message from content assembly module 342, dispatcher API 344 may create connections (as defined in the JNDI or by default) and send remote notifications over these connections. If notification service has firewall settings configured to close idle socket connections, then they can use the JNDI properties to close the sockets before the firewall terminates them.

In some embodiments, dispatcher API 344 may encrypt the data before sending it to prevent man in the middle attacks. Further, dispatcher API 344 may perform operations to call and queue messages. For example, dispatcher API 344 may locally store messages when a client is unavailable and release them when the client comes online and the push service can deliver the messages. Dispatcher API 344 may also define how the push notifications are queued and include priority rules. Dispatcher API 344 may also append information to the message created by content assembly module 342. For example, dispatcher API 344 may include a time-to-live for a push notification, the urgency of the message (for example, non urgent messages may be not displayed if client device is in a saving battery mode), append client information, and/or a push message with a "topic" name which will replace any pending message with this new message.

Message memory 350 may include one or more storage devices configured to store instructions used by message processor 340 to perform operations related to disclosed embodiments. For example, message memory 350 may store software instructions, such as message program 352, that may perform operations when executed by message processor 340. In addition message memory 350 may include push notifications, emails, and SMSs templates that may be called based on user preferences. For example, message memory 350 may include templates for Android operating system and iOS operating systems. Depending on user account information, message processor 340 may retrieve different templates for the devices with different operating system. Further, message data 354, may include logs of dispatched notifications, generated URIs, and notification service requirements.

In certain embodiments, message memory 350 may store sets of instructions for carrying out processes to generate and transmit the enhanced push notifications for credit card declines. For example, service system 105 may execute processes stored in message memory 350 using information from databases 180 and/or data from transaction manager 110.

Figure 4:
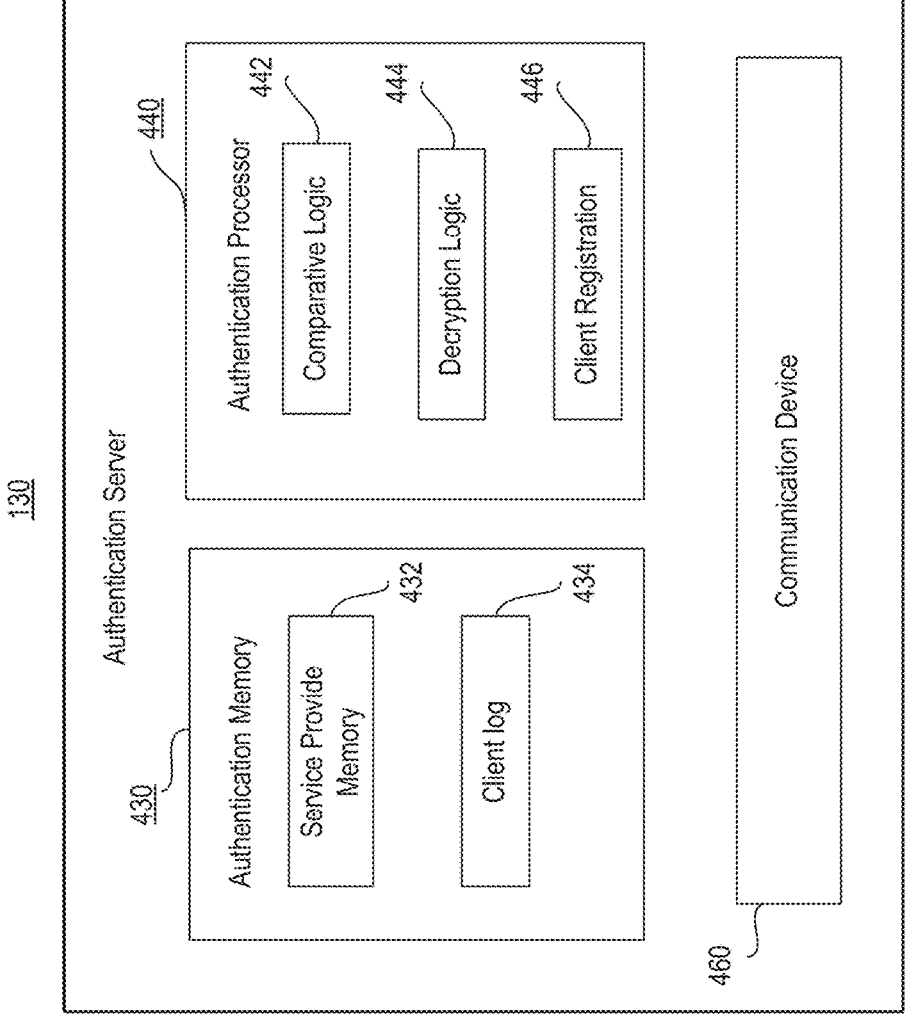
FIG. 4 is a block diagram of an exemplary authentication server, consistent with disclosed embodiments.

Referring now to FIG. 4, there is shown a block diagram of an exemplary authentication server 130 (FIG. 1), consistent with disclosed embodiments. Authentication server 130 may include an authentication memory 430, an authentication processor 440, and a communication device 460. In some embodiments, authentication server 130 may be configured to communicate with messaging server 120 to identify validity of user credentials.

The difficulties of performing authentication steps in the client device, particularly in time-sensitive situations, may be alleviated by using push notifications and transferring some of the authentication steps in authentication server 130. In some embodiments, authentication server 130 may use password/user combinations to authorize users. Alternatively, or additionally, authentication server 130 may use biometric data. In such embodiments, client devices 150 may include a biometric sensor, as further described in connection with FIG. 6, and authentication server 130 may store biometric information. Further, in some embodiments, authentication server 130 may perform cryptographic functions to decrypt private and/or public keys, and verify that the user has been successfully authenticated.

Authentication memory 430 may include one or more storage devices configured to store instructions for handling user requests, user information, credentials information, and/or identification information of client devices 150. Authentication memory 430 may include client logs 434, which may record interactions between client devices 150, third-party systems 160, and service system 105. In addition, authentication memory 430 may include a service provider memory 432, which may include information about user accounts. For example, service provider memory 432 may include databases including user preferences that may determine whether or not the user has opted in to use biometric authentication. Additionally, or alternatively, service provider memory 432 may include user account information, such as available balance or credit, or user-generated account locks.

Authentication memory 430 may include storage devices storing instructions used by authentication processor 440 to perform functions related to disclosed embodiments. For example, authentication memory 430 may store software instructions that may perform one or more operations when executed by authentication processor 440. In addition, authentication memory 430 may store user records of account history and normal patterns to identify potential fraud.

Authentication processor 440 may be embodied as a processor similar to transaction processors 230. Authentication processor 440 processor may include comparative logic 442, decryption logic 444, and a client registration 446.

Comparative logic 442, may be implemented with hardware or software to compare credentials received from client devices 150, such as passwords or biometric data received from the client devices 150, with information associated with the particular user account. For example, a user account may be associated with a client device 150 associated with a specific MAC address. Then, comparative logic 442 may compare two MAC address templates to identify client devices 150. In other embodiments, comparative logic 442 may include a feature extraction which generates a normalized data file from client requests to more efficiently determine if the device can be authenticated. In such embodiments, a template stored in authentication server 130, for example in authentication memory 430, may be compared with extracted features of client devices 150.

Decryption logic 444 may perform decryption algorithms based on validation policies to decrypt information and return the decrypted information to other elements of system 100, such as transaction manager 110. For example, the response from client devices 150 may be encrypted. In such embodiments once a response is received from client devices, decryption logic 444 may decrypt the information and transmit it to transaction manager 110 to finalize a transaction. In some embodiments, decryption logic 444 may use one or more of the partner key(s), user's private key, public keys, as well as the partner's public key to safely communicate with the other parts of system 100.

Client registration 446 may perform instructions to determine whether the user has enabled device-level authentication and is enrolled in the notifications program. Client registration 446 may also determine if the user account has determined preferences and may store user preferences when communicated via, for example, transaction manager 110. Client registration 446 may also update entries in databases 180 and may generate public/private key pairs for the newly registered users that enroll in push notifications. In some embodiments, client registration 446 may certify the key using other servers or a certification authority. For example, client registration 446 may communicate with an external certification authority, such as VeriSign. In other embodiments, the certification authority may be an internal certification authority within the authentication server 130.

Figure 5:
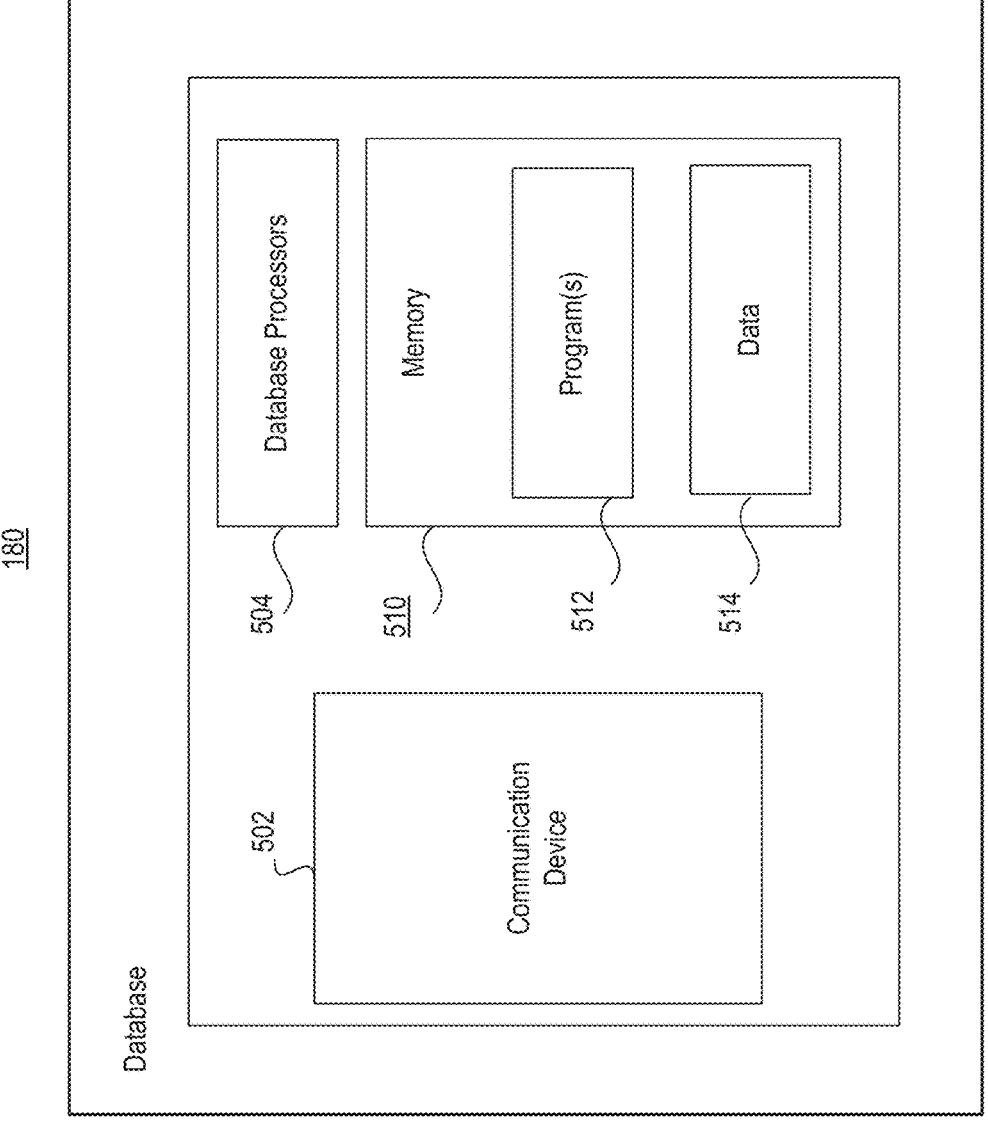
FIG. 5 is a block diagram of an exemplary database, consistent with disclosed embodiments.

Referring now to FIG. 5, there is shown a block diagram of an exemplary database 180 (FIG. 1), consistent with disclosed embodiments. Database 180 may include a communication device 502, one or more database processors 504, and database memory 510 including one or more database programs 512 and data 514.

In some embodiments, databases 180 may take the form of servers, general purpose computers, mainframe computers, or any combination of these components. Other implementations consistent with disclosed embodiments are possible as well.

Communication device 502 may be configured to communicate with one or more components of system 100, such as online resources 140, service system 105, messaging server 120, authentication server 130, and/or client devices 150. In particular, communication device 502 may be configured to provide to messaging server 120 and transaction manager 110 user account information and/or user preferences.

Communication device 502 may be configured to communicate with other components as well, including, for example, message memory 350 (FIG. 3). Communication device 502 may take any of the forms described above for communication device 210 (FIG. 2).

Database processors 504, database memory 510, database programs 512, and data 514 may take any of the forms described above for transaction processors 230, memory 220, transactions programs 222, and transaction data 224, respectively, in connection with FIG. 2. The components of databases 180 may be implemented in hardware, software, or a combination of both hardware and software. For example, although one or more components of databases 180 may be implemented as a computer executing instruction modules, all or a portion of the functionality of databases 180 may be implemented instead in dedicated hardware circuitry.

Data 514 may be data associated with websites, such as online resources 140, or user accounts from client devices 150. Data 514 may include, for example, information relating to websites, or information about merchants that receive credit cards.

Figure 6:
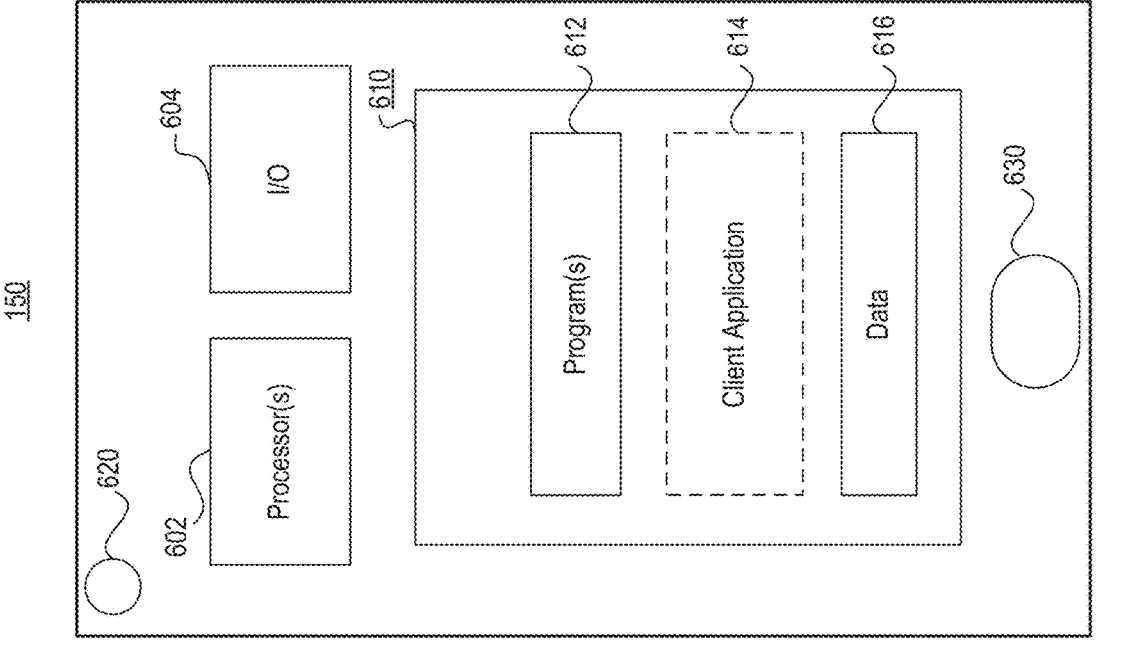
FIG. 6 is a block diagram of an exemplary client device, consistent with disclosed embodiments.

Referring now to FIG. 6, there is shown a block diagram of an exemplary client device 150 (FIG. 1), consistent with disclosed embodiments. In one embodiment, client devices 150 may include one or more processors 602, one or more input/output (I/O) devices 604, and one or more memories 610. In some embodiments, client devices 150 may take the form of mobile computing devices such as smartphones or tablets, general purpose computers, or any combination of these components. Alternatively, client devices 150 (or systems including client devices 150) may be configured as a particular apparatus, embedded system, dedicated circuit, and the like based on the storage, execution, and/or implementation of the software instructions that perform one or more operations consistent with the disclosed embodiments. According to some embodiments, client devices 150 may include web browsers, mobile applications, or similar software modules that access services consistent with disclosed embodiments.

Processor 602 may include one or more known processing devices, such as mobile device microprocessors manufactured by Intel™, NVIDIA™, or various processors from other manufacturers. The disclosed embodiments are not limited to any specific type of processor configured in client devices 150.

Memory 610 may include one or more storage devices configured to store instructions used by processor 602 to perform functions related to disclosed embodiments. For example, memory 610 may be configured with one or more software modules, such as programs 612 that may perform operations when executed by processor 602. The disclosed embodiments are not limited to separate programs or computers configured to perform dedicated tasks. For example, memory 610 may include a single program 612 that performs the functions of the client devices 150, or program 612 may include multiple programs. Memory 610 may also store data 616 that is used for processing push notifications. That is, memory 610 may include instructions to interpret and apply instructions in the payload of push notifications.

In certain embodiments, memory 610 may store instructions for displaying graphical user interfaces in client devices 150, such as the graphical user interfaces described in connection with FIGS. 14A-14L. In certain embodiments, instructions from messages from service system 105 may be executed by a client application 614. Moreover, in some embodiments if client application 614 is not part of memory 610, client devices 150 may be unable to perform tasks instructed in the payload of push notifications and require other kind of messages, such as SMS or emails. Moreover, memory 610 may include information required to communicate with other elements of system 100. For example, memory 610 may include server addresses and instructions for communication with edge server 190. Further client application 614 may be configured to perform automated operations, such as transmitting a decline message when a user does not act within a determined time threshold of receiving a push notification. Additional operations that may be executed by client devices using client application 614 are further described below in connection with FIG. 9.

Moreover, other software components may be configured to request information from service system 105 or determine the location of client devices 150. For instance, these software instructions, when executed by processor(s) 602 may process information to display the status of a transaction.

I/O devices 604 may include one or more devices configured to allow data to be received and/or transmitted by client devices 150 and to allow client devices 150 to communicate with other machines and devices, such as other components of system 100. For example, I/O devices 604 may include a screen for displaying optical payment methods such as Quick Response Codes (OR), or providing information to the user. VO devices 604 may also include components for NFC communication. VO devices 604 may also include one or more digital and/or analog devices that allow a user to interact with client devices 150 such as a touch-sensitive area, buttons, or microphones. VO devices 604 may also include one or more accelerometers to detect the orientation and inertia of client devices 150. I/O devices 604 may also include other components known in the art for interacting with service system 105.

In some embodiments, client devices 150 may also include an imaging device, such as a camera 620, that captures images and facilitates biometric authentication processes, such as facial recognition. Additionally, or alternatively, client devices 150 may include a fingerprint sensor 630 that allows users to unlock client devices 150, make purchases, and/or perform authentications. Both camera 620 and fingerprint sensor 630 may be operated by processor 602 and use encryption security to make it impossible for users to externally access fingerprint or camera information.

Figure 7:
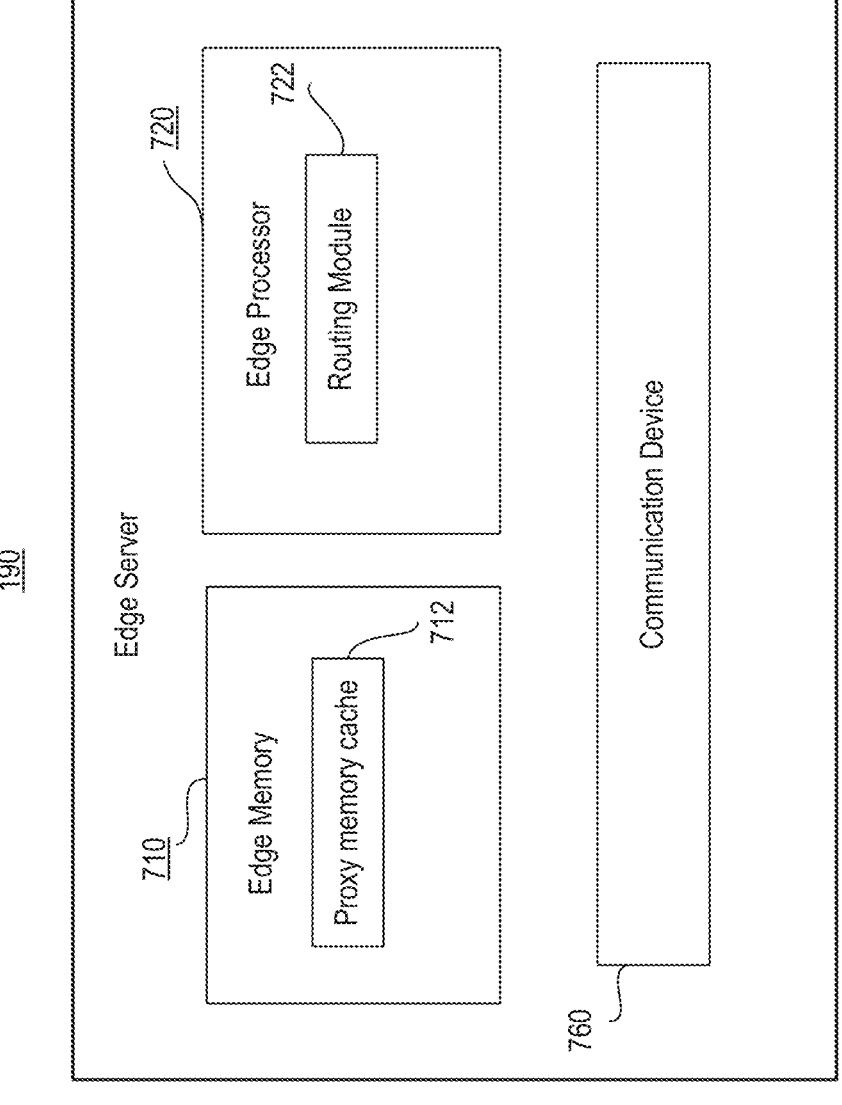
FIG. 7 is a block diagram of an exemplary edge server, consistent with disclosed embodiments.

Referring now to FIG. 7, there is shown a block diagram of an exemplary edge server 190 (FIG. 1), consistent with disclosed embodiments. Edge server 190 may include an edge memory 710, and edge processor 720, and a communication device 760. In some embodiments, as shown in FIG. 1, edge server may be coupled to client devices.

Edge processor 720 may be embodied as a processor similar to transaction processors 230. Edge processor 720 may include a routing module 722, which may perform instructions to relay messages to different elements of system 100. For example, routing module 722 may perform operations to identify one of client devices 150 and send messages to the selected device. Further, routing module 722 may perform operations to transmit responses from client devices 150 to service system 105. Moreover, in some embodiments, edge processor 720 may be configured to generate basic notification processing. For example, edge server 710 may be configured to transmit indications of successful message delivery. Edge processor 720 may perform operations of transmitting and receiving acknowledgements of push notification receptions. Further, edge server 710 may perform operations to generate firewalls or implement security protocols and may evaluate bandwidth utilization of communication device 760 to engage other servers when reaching limiting bandwidths.

Edge memory 710 may include one or more storage devices configured to store instructions used by edge processor 720 to perform operations related to disclosed embodiments. For example, edge memory 710 may store software instructions that may be executed by edge processor 720 to interface with client devices 150 and service system 105. In addition, edge memory 710 may include a proxy memory cache 712, which may include user account information or client logs. Edge memory 710 may also include a media cache controller (not shown) that may control and analyze the status and operation of edge server 190. Further, edge memory 710 may include identifying information of client devices 150.

Figure 8:
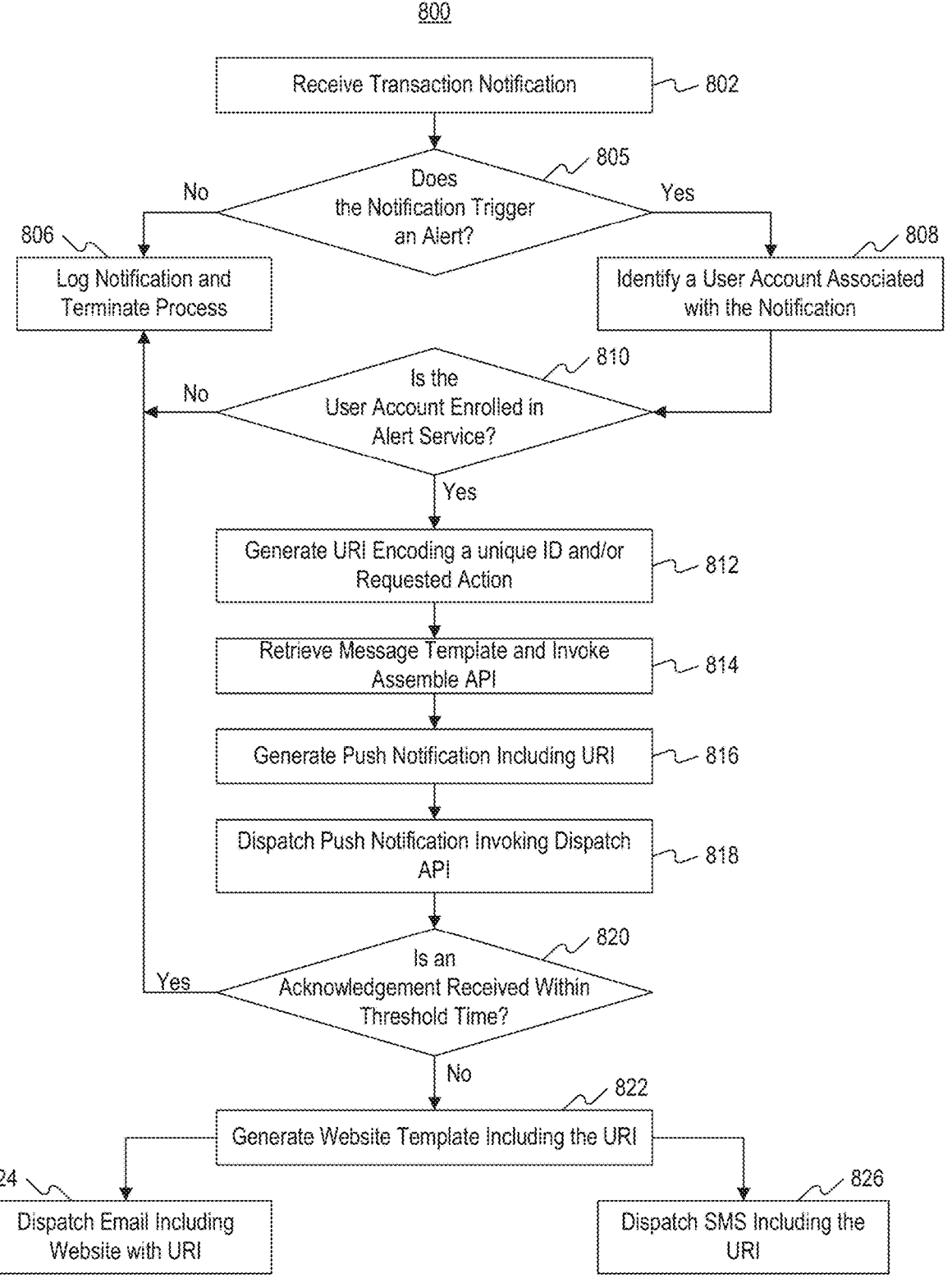
FIG. 8 is a flow chart of an exemplary notification transmission process, consistent with disclosed embodiments.

Referring now to FIG. 8, there is shown a flow chart of an exemplary notification transmission process 800, consistent with disclosed embodiments. In some embodiments, transmission process 800 may be executed by service system 105 (FIG. 1). For example, transmission process 800 may be performed by transaction manager 110 and messaging server 120.

In step 802, service system 105 may receive a transaction notification. For example, service system 105 may receive a transaction notification from one of third-party systems 160. In some embodiments, the transaction notification may include a purchase decline notice, an inactive account, or a request to confirm a purchase. For example, in step 802 service system 105 may receive a transaction notification indicating that a credit card was declined. In such embodiments, the transaction notification may also include information about a merchant and transaction amount.

In step 805, service system 105 may determine whether the transaction notification triggers an alert. For example, service system 105 may process the transaction notification and associate it with a user account, to determine whether the transaction notification can be addressed with a message to client devices 150. Service system 105 may, for example, determine that if a credit card decline is due to a user locking its account, an alert notification should be triggered. However, if the credit card decline is due to lack of funds, the account being permanently closed, or potential fraud, service system 105 may decide not to generate an alert.

If service system 105 determines not to trigger an alert based on the transaction notification (step 805: no), service system 105 may continue to step 806, log a record of the notification, and terminate the process. For example, if service system 105 determines the transaction notification is caused by lack of funds or the decline cause cannot be resolved quickly, service system 105 may record the transaction in transaction memory 220 and terminate the notification transmission process. However, if service system 105 determines the transaction notification triggers an alert (step 805: yes), service system 105 may continue to step 808, engage alert trigger module 232 and identify a user account associated with the notification. For example, service system 105 may correlate a credit card number in the transaction notification with a user account.

In step 810, service system 105 may determine whether the user account, associated with the transaction notification, is enrolled to receive alerts in a mobile device. For example, service system 105 may fetch user account preferences from databases 180, or from transaction memory 220, and determine whether the user account is enrolled to receive push notifications, SMS, or emails. If service system 105 determines the user account is not enrolled in the alert service (step 810: no), service system 105 may continue to step 806, log the transaction notification, and terminate the process. However, if service system 105 determines the user account is enrolled in the alert service (step 810: yes), service system 105 may continue to step 812.

In step 812, service system 105 may generate a URI that encodes a unique ID and/or a requested action. For example, service system 105 may determine an available action based on the transaction notification to generate a URI. The URI may encode in alphanumeric strings a message ID with an interactive session identification and an action ID with encoded instructions that may be interpreted by, for example, the one-click response API 236. For instance, in embodiments where the transaction notification indicates a credit card decline, the URI of step 812 may encode a unique alpha-numeric ID that identifies an interactive session with IMR 240 (FIG. 2) and an action ID of unlocking the credit card. The URI of step 812 may also include a file path to servers on system 100, requests to call specific APIs, identification of templates, and descriptions for errors.

In some embodiments, the URI may encode instructions to activate a card. For example, in some embodiments a credit card transaction may be declined because the card has not been activated. In such embodiments, the URI generated in step 812 may encode an action of activating the credit card and displaying information of the reasons for decline as being an inactivated card. The URI may also include instructions that are not related to declined transactions. For example, the URI may include an action ID to authorize a payment. A user account may have preferences to request confirmation for purchases above a threshold amount. In such scenarios, the URI for the push notification payload may include instructions to allow the transactions. Further, the URI may include instructions to make payments without a physical card. For example, when doing online purchases the URI for payload in the push notification may encode actions to make a payment and/or confirm the transaction.

In step 814, service system 105 may retrieve a message template for generating a push notification, an email, and/or an SMS. In some embodiments, service system 105 may retrieve templates from message memory 350 and/or by invoking content assembly module 342. Templates retrieved in step 814 may be based on information of user account as identified in step 808. For example, if user account information indicates the user is associated with an Apple™ mobile device, the template retrieved in step 814 may be for Apple™ devices and use the specification of APNS. However, if user account information indicates the user is associated with an Android™ device, the template retrieved in step 814 may be for GCM. Alternatively, or additionally, the template may be selected based on user preferences such as generating a message with a sound or vibration alert, or be a silent alert.

In step 816, service system 105 may generate a push notification that includes the URI of step 812 as part of its payload. For example, using content assembly module 342 and an associated API, service system 105 may configure a push notification with customized messages and a customized payload that includes the URI. In such embodiments, the push notification may use the template retrieved in step 814 to generate the push notification. The push notification may specify the unique identifier of the interactive session, categories, titles, and actions, as further described in connection with FIG. 15. With a generated push notification, in step 818 service system 105 may dispatch the push notification to a notification server. For example, using message processor 340 service system 105 may invoke dispatcher API 344 to interact with notification servers such as APNS or GCM. In some embodiments, the push notification payload may include instructions to display an alert including information of the transaction notification. Further, the instructions to display an alert may include instructions to display an alert in a first graphical user interface of client device 150; and the payload may also include instructions to display a message and an icon in the client device on a second graphical user interface that follows the first graphical user interface. In some embodiments, the instructions to display the alert, message, or interactive icons may be executable by client application 614 (FIG. 6).

In step 820, service system 105 may determine whether an acknowledgement to the push notification was received within a threshold time. After the push notification is dispatched, service system 105 may begin a timer to wait for a response. For example, once a client receives a push notification a client application (running in a mobile device) may generate an acknowledgement. If no acknowledgement is received by service system 105, the push notification delivery may have been unsuccessful. Service system 105 may, therefore, want to attempt to contact the user with a different communication tool. In step 820 service system 105 may determine whether the acknowledgement has been received within the threshold time before preparing alternative messages, such as email or SMS.

If service system 105 determines the acknowledgement was received within a threshold time (step 820: yes), the push notification may have been successfully received by the client device and service system 105 may continue to step 806 and log the notification as having been received by the client. However, if service system 105 determines the acknowledgement was not received within a threshold time (step 820: no), service system 105 may continue to step 822 and generate a website template for configuring a customized web page for a one-click interaction. In such embodiments, the website template may include the generated URI and interactive icons to quickly receive user instructions.

Service system 105 may continue to step 824 and dispatch an email that includes a customized website with the URI of step 812. Alternatively, or additionally, service system 105 may continue to step 826 and dispatch an SMS that includes a URL to the customized website or that directly has the URI. The selection between steps 824 and 826 may be based on preferences in the user account identified in step 808. However, in other embodiments, both messages may be created and dispatched concurrently to improve the chances of obtaining a user response.

Figure 9:
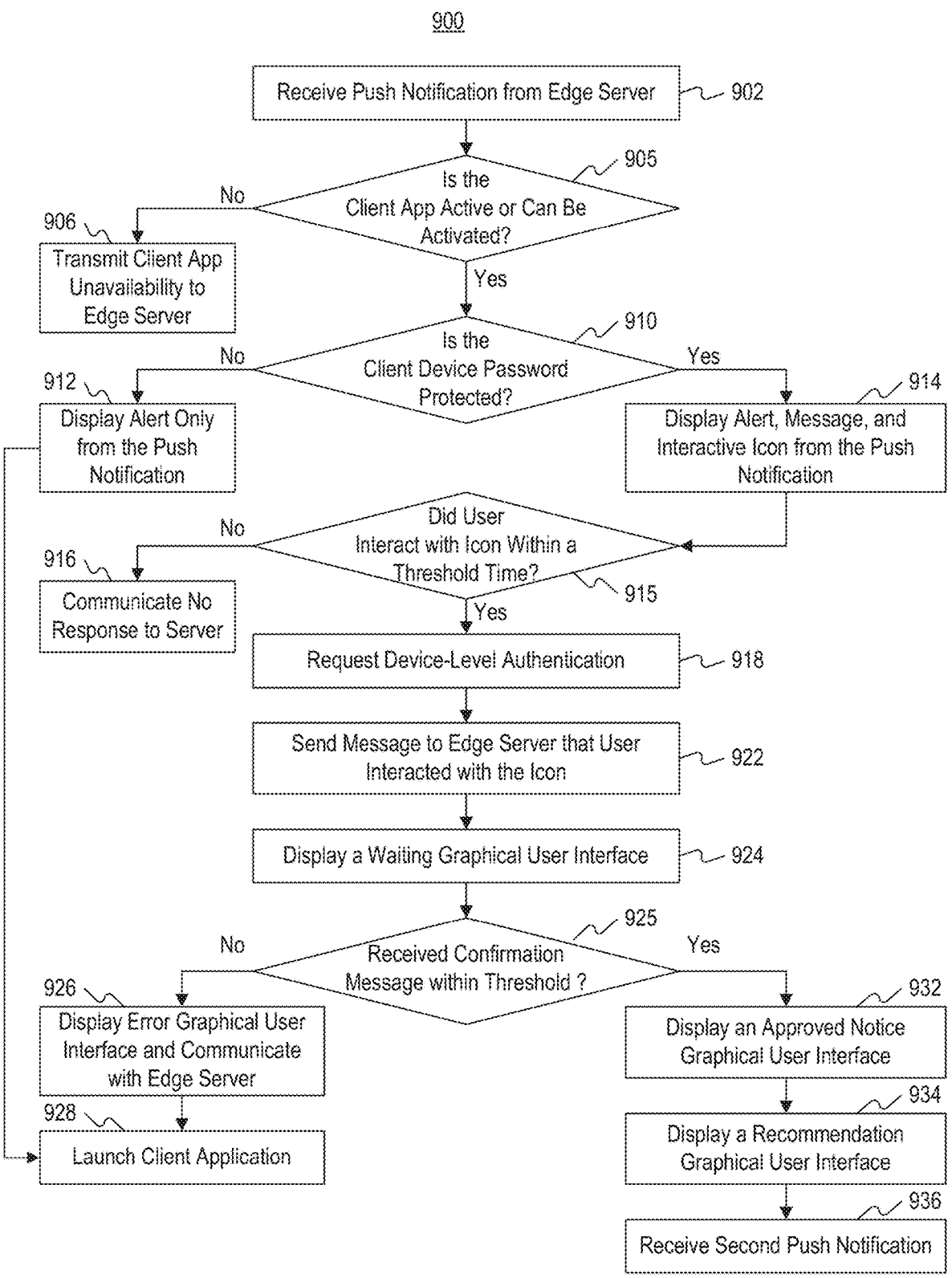
FIG. 9 is a flow chart of an exemplary notification reception process, consistent with disclosed embodiments.

Referring now to FIG. 9, there is shown a flow chart of a notification reception process 900, consistent with disclosed embodiments. Reception process 900 may be carried out by client devices 150 executing client application 614 (FIG. 6). However, in other embodiments, other elements of system 100, such as online resources 140, may execute reception process 900.

In step 902, one of client devices 150 may receive a push notification. For example, a client device 150 may receive an interactive push notification dispatched in step 818. In some embodiments, the push notification may be received from edge server 190. For example, a dispatch service may use edge server 190, geographically close to client device 150, to minimize delays in the responses.

In step 905, client device 150 may determine if an application to interpret and execute the push notification, such as client application 614, is active. If client application 614 is not active, client device 150 may determine whether it can be activated. For example, before client devices 150 process the push notification, client devices 150 may query active processes in the operating system to determine whether there are available resources to display the push notification. Alternatively, or additionally, client device 150 may query user settings in client device 150 to determine whether the user accepts the display of push notifications.

If client device 150 determines that client application 614, or similar resources, are not active and cannot be activated (step 905: no), client devices 150 may continue to step 906 and return a response indicating that client application 614 is unavailable. For example, client device 150 may automatically communicate with edge server 190 with an indication of unsuccessful notification. If, however, client device 150 determines that client application 614, or similar resources, are active or can be activated (step 905: yes), client device 150 may continue to step 910.

In step 910, client device 150 may determine whether client device 150 is password protected. For example, client device 150 may call a device management API to use a Grepcode page and a "getLong( )" function to retrieve the value of the security settings. Further, in step 910, client device 150 may determine if security settings have been enabled in client device 150 for different authentication mechanism. For example, client device 150 may determine if pattern protection is enabled using functions such as "getInt(getContentResolver( ) Settings.System.LOCK_PAT-TERN_ENABLED, 0)." Alternatively, or additionally, client device 150 may employ functions to determine if there is alphanumeric password protection, face identification, or fingerprint identification. For example, client device 150 may employ functions such as "lockType=LockType.getCurrent(getContentResolver( )" to identify security settings.

In some embodiments, in step 910 client device 150 may determine if the authentication process has a minimum security standard. Authentication processes that are too simple may not be sufficient to prevent fraud. For example, when the device authentication is a password of 4 consecutive numbers, or a single line pattern, the devices may be accessed by untrusted users. Then, client devices 150 may utilize password quality functions to determine if the password quality meet a standard set by service system 105. If the standard is not met, client devices 150 may decline to provide the interactive icons and only show the alert. For example, client devices may use functions to acquire a device policy that indicates the quality of the password such as "long mode=os.provider.settings.secure.getLong (contentResolver, DevicePolicyManager.PASSWORD_QUAL-ITY)." Additionally, or alternatively, in step 910 client application 614 may determine if the client device 150 is password protected by evaluating the size of a security file. These mechanisms would enable client application 614 determine whether the security in the client device meets a standard of service system 105.

If in step 910 client device 150 determines the client device is not password protected, or the password does not meet the standard, (step 910: no), client device 150 may continue to step 912 and display only the alert of the push notification without displaying interactive options. For example, service system 105 may require that password protections have at least 6 digits. If client device 150 determines there is not enabled security, or the enabled security has less than 6 digits, it may not show interactive options and only show the alert of the push notification. However, if in step 910 client device 150 determines the client device is password protected and/or it meets the standard (step 910: yes), client device 150 may continue to step 914 and display the push notification with the alert, the message, and interactive icon, as described in the push notification payload.

In step 915, client device 150 may determine whether the user actuated the interactive elements of the push notification. For example, client device 150 may determine whether the user pressed one of the buttons associated with the push notification or used a slide button. If the user has not interacted with the push notification (step 915: no), client device 150 may continue to step 916 and transmit a message of no response. For example, if after a threshold time the user does not interact with a button, encoded as part of the push notification, client device 150 may send a message to edge server 190 indicating the user did not respond. In such embodiments, service system 105 may be configured to close pending sessions if after 30 seconds of receiving the push notification the user does not interact with the push notification. Accordingly, the no response message in step 916 may be delivered to service system 105 after a time threshold so service system 105 may terminate opened sessions and release resources.

However, if client device 150 determines the user interacted with the push notification (step 915: yes), client device 150 may continue to step 918 and request device-level authentication. The device level authentication may include password, finger print, image identification, among others. In some embodiments, the type of authentication may be determined based on the quality of the authentication as determined in step 910. If the device-level authentication is successful, client device 150 may continue to step 922. In step 922 client device 150 may configure and send a message indicating that the user interacted with the push notification. For example, when a user provides a successful fingerprint authentication, client device 150 may send a message to edge server 190 indicating the user interacted with a button of the push notification. The message from client device 150 may include the URI that was received with the push notification.

In step 924, client device 150 may indicate a "waiting" status on a graphical interface, after sending the message of interaction. For example, while waiting for a confirmation from service system 105, client device 150 may display a graphical user interface including a processing icon, as further described in connection with FIG. 14D. In step 925 may determine whether a confirmation message was received within a threshold time. For example, client device 150 may determine whether service system 105 accepted the request encoded in the URI in step 925 based on a confirmation message. The confirmation message may be waited for a threshold time of, for example, 5-20 seconds.

If client device 150 does not receive a confirmation message within a threshold time (step 925: no), client device 150 may continue to step 926 and indicate an "error" status on a graphical user interface, as further described in connection with FIG. 14H. Client device may also communicate with edge server 190 to indicate the client instructions were not successfully processed. In such scenarios, client device 150 may continue to step 928 and launch client application 614 so the user has the opportunity to resolve issues using the client application 614, instead of the push notification. For example, in step 928 client device 150 may start client application 614 that communicates with service system 105. However, if client device 150 receives a confirmation message within a threshold time (step 925: yes), client device 150 may continue to step 932 and display an "approved" notice on a graphical user interface, further described in connection with FIG. 14E.

In step 934, client device 150 may also display a recommendation graphical user interface. For example, when the push notification informed of a credit card decline because the credit card was locked and the URI encoded instructions to unlock the credit card, in step 934 client device 150 may display a "recommendation" notice on a graphical user interface (GUI) recommending that the user try to perform the transaction again. In step 936, client device 150 may receive and display a second push notification. In some embodiments, the second push notification may inform that the issue was resolved and the transaction was approved. The second push notification may include information about the transaction, such as the amount and merchant. In some embodiments, the second push notification may also include a payload with instructions to display interactive icons to, for example, collect survey information or collect tracking information of consumer engagement. In some embodiments, the second push notification received in step 936 may include buttons with a "call-to-action" to respond to consumer surveys. The second push notification may include a second alert message identifying the third party and specifying a transaction amount in the transaction notification.

Figure 10:
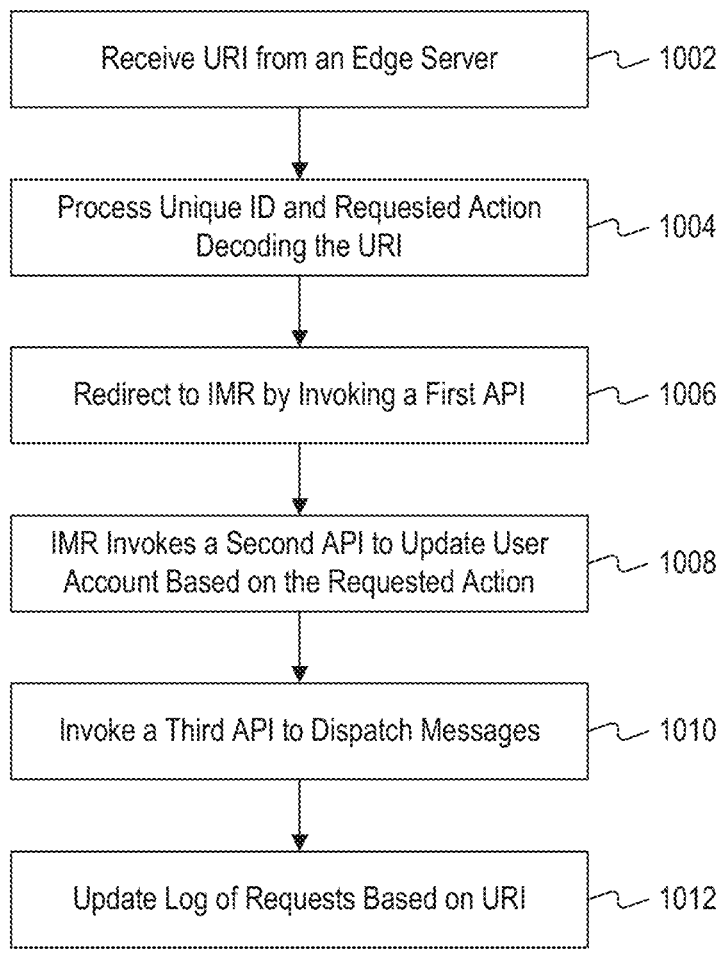
FIG. 10 is a flow chart of an exemplary account updating process, consistent with disclosed embodiments.

FIG. 10 shows a flow chart of an exemplary account updating process 1000, consistent with disclosed embodiments. In some embodiments, service system 105 may carry out updating process 1000. For instance, in some embodiments, updating process 1000 may be performed by transaction manager 110.

In step 1002, service system 105 may receive a message that includes an encoded URI that identifies a user account and a requested action. For example, in step 1002 service system 105 may obtain a message with the URI, as generated in step 812 (FIG. 8), from edge server 190. Alternatively, service system 105 may receive a message from client devices 150 via network 170.

In step 1004, service system 105 may decode a unique ID, which may be associated with a user account and/or an interactive session, and a requested action based on the information encoded in the URI. For example, from a message ID in the URI, service system 105 may gather information required to request a user account from a database; and from an action ID, service system 105 may identify a requested action or update for the user account. Service system 105 may apply functions such as "decodeURI( )" to resolve the URI and an interactive session and/or actions. In such embodiments, service system 105 may take a message ID and replaces each escape sequence in with a representing character. Further, in step 1004 service system 105 may determine whether the message was received from an authenticated client device 150, or may query records of transactions to determine if there is any potential fraud.

In step 1006, service system 105 may redirect the request and client information to an implementation repository, such as IMR 240, to process the request. For example, invoking one-click response API 236, service system 105 may interface with IMR 240 to allocate the request to a specific server that has the ability to access and update the user account. Further, in step 1006 service system 105 may establish an interactive session with other elements of system 100 to update the user account.

In step 1008, service system 105 may update the user account based on the request encoded in the URI. For example, service system 105 may invoke a capability API to exchange information with a user preferences database. Alternatively, or additionally, when the action ID includes unlocking a credit card or a user account, service system 105 may call an unlock card API to execute the user instructions received through the interactive elements of the push notification. In other embodiments, the action ID may a card activation request or approve a transaction. Then, in step 1008, service system 105 may call for an activation API or an approve transaction API.

In step 1010, service system 105 may receive a confirmation from account preferences servers that the system has been updated. For example, service system 105 may receive a message confirming that the user account is now unlocked. Service system 105 may invoke a message dispatcher API in step 1010 to generate and transmit confirmation messages such as the message described in connection with step 925 (FIG. 9). In some embodiments, in step 1010 service system 105 may queue tasks using an elastic cache or may employ specialized hardware, such as FPGAs, to process the requests and handle workflow of repositories and servers.

In step 1012, service system 105 may update a log of requests based on the URI information. For example, service system 105 may update databases 180, or transaction memory 220, to reflect that the operation triggered by the push notification has been completed and the user preferences were updated.

Figure 11A:
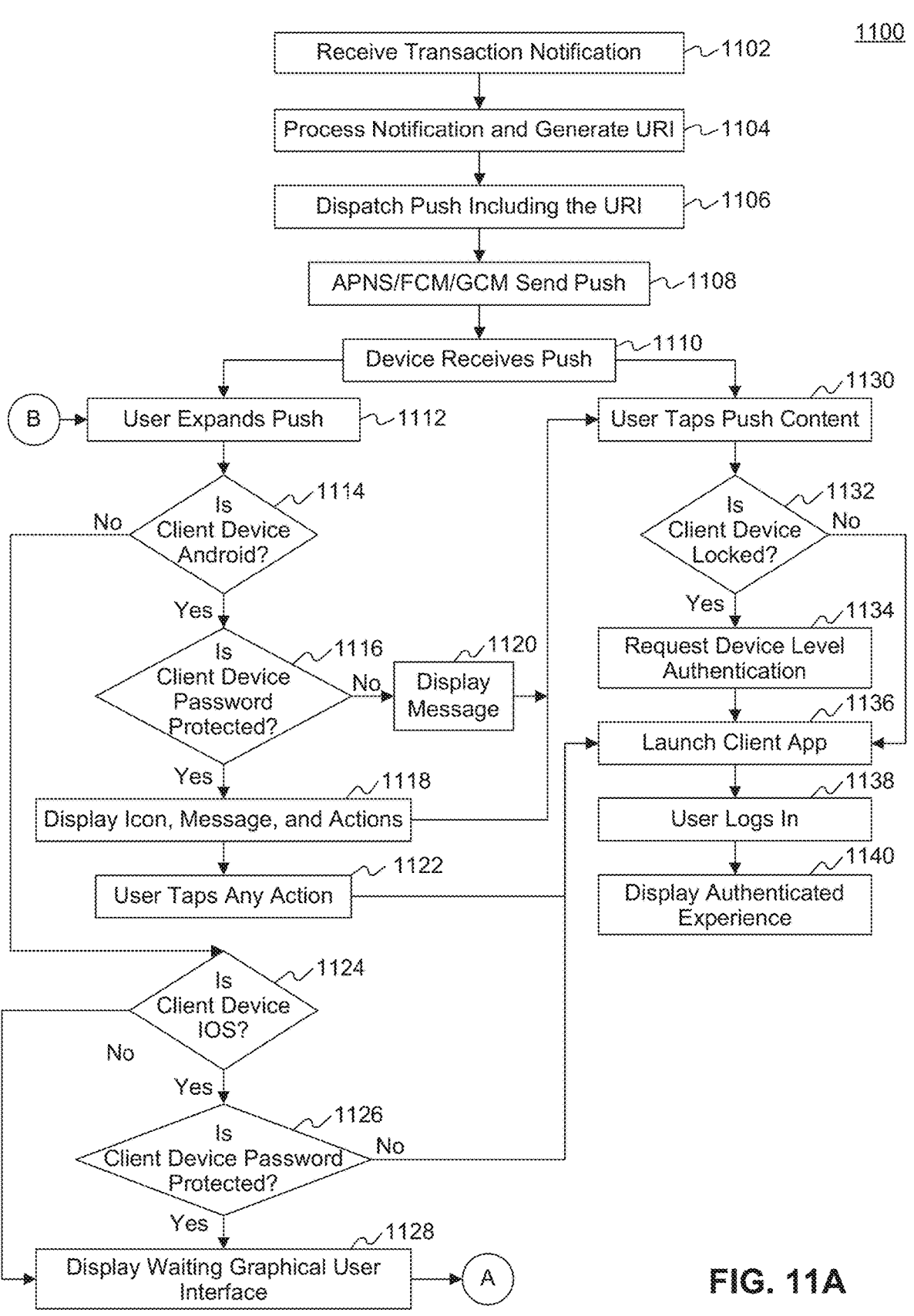
FIG. 11A is a first part of a flow chart of an exemplary push notification process, consistent with disclosed embodiments.
Figure 11B:
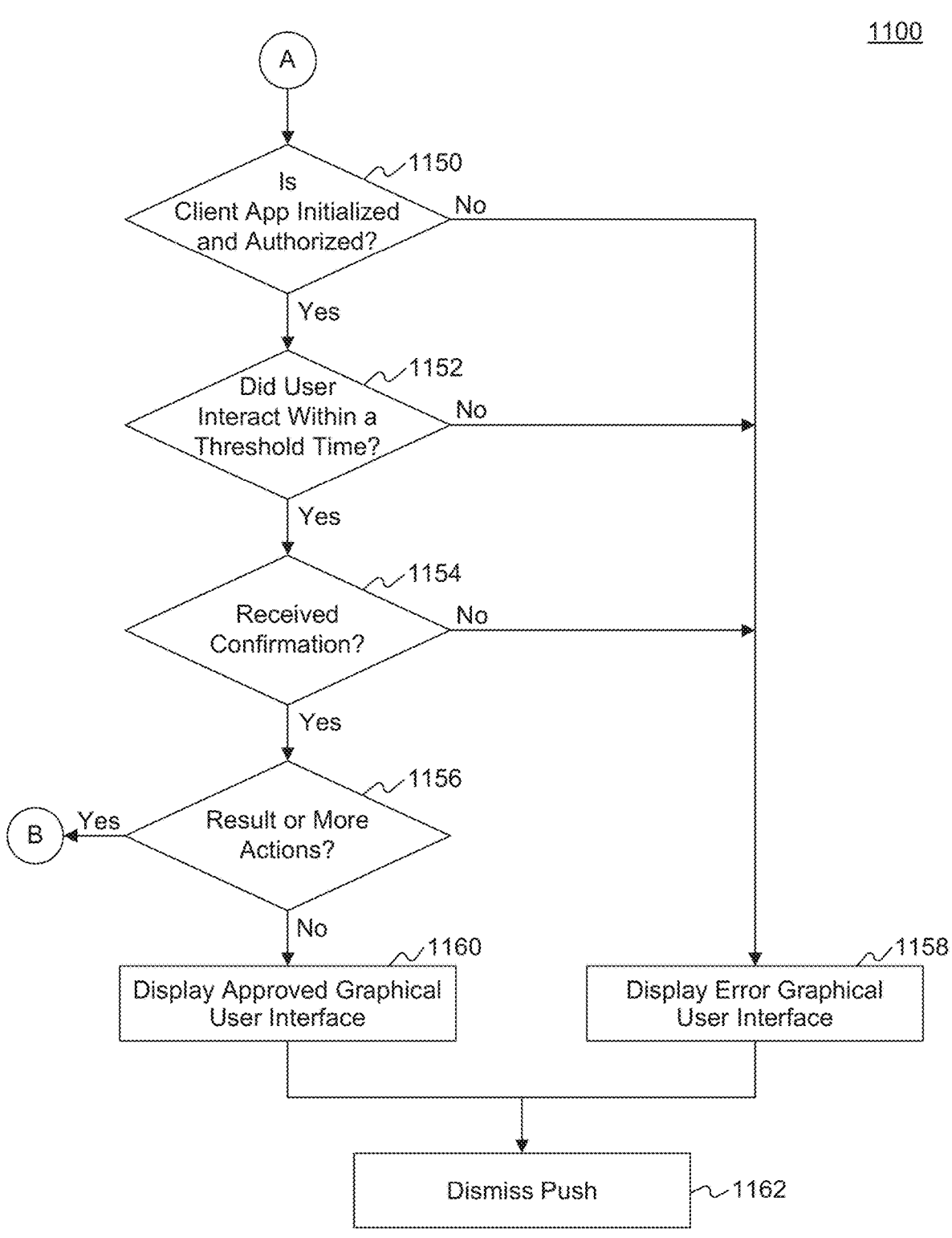
FIG. 11B is a second part of a flow chart of an exemplary push notification process, consistent with disclosed embodiments.

Referring now to FIGS. 11A and 11B, there is shown a process flow diagram of an exemplary push notification process 1100, consistent with disclosed embodiments. In some embodiments, service system 105 may carry out push notification process 1100 in conjunction with other elements of system 100. For instance, in some embodiments, push notification process 1100 may be performed by transaction manager 110 (FIG. 2) and client devices 150 (FIG. 6). However, in other embodiments, other elements of system 100, such as online resources 140 or databases 180, may execute push notification process 1100.

In step 1102, a first element of system 100, such as service system 105, may receive a transaction notification. For example, transaction manager 110 may receive a transaction notification from one of third-party systems 160.

In step 1104, the first element of system 100 may process the transaction notification and generate a URI. For example, transaction manager 110 may identify a user account associated with the notification and generate a URI with a unique ID.

In step 1106, the first element of system 100 may dispatch a push notification which includes the URI. As shown in FIG. 11A, the push notification may be transmitted using APNS in step 1108. In other embodiments, however, the push notification may be transmitted using GCM. In yet other embodiments, the push notification may be transmitted using Firebase Cloud Messaging (FCM).

In step 1110, a second element of system 100 may receive the push notification. For example, client devices 150 may receive the push notification. In response, a user of client devices 150 may expand the push notification (step 1112) and/or tap the push notification (step 1130).

When a user expands the push notification (step 1112), push notification process 1100 may continue to step 1114, in which client devices 150 and/or service system 105 determines whether the device receiving the push notification operates an Android™ operating system. If the device is operating with Android™ (step 1114: yes), process 1100 may continue to step 1116 and determine if the device is password-protected. If the device is not password-protected (step 1116: no) process 1100 may continue to step 1120 and display one of the graphical user interfaces, as described in connection with FIG. 14, and continue to step 1130 to assess if the user has tapped the push notification. However, if the device is password-protected (step 1116: yes), process 1100 may continue to step 1118 and display an icon, a message, and actions. In some embodiments, the icon, message, and actions displayed in step 1118 may be based on an URI received with the push notification. Process 1100 may then continue to step 1122 and receive a tap in one or more action from a user.

In some embodiments, process 1100 may include step 1124, in which service system 105 determines if the second element of system 100—which received the push notification—operates with iOS™. In such embodiments, for example, service system 105 may determine whether a client device 150 is operating with iOS™. If the device receiving the push notification operates with iOS™, (step 1124: yes) process 1100 may continue to step 1126 and determine if the device is password-protected. If the device is password-protected (step 1126: yes), process 1100 may continue to step 1128 and display a waiting graphical user interface. However, if the device is not password-protected (step 1126: no), process 1100 may continue to step 1136 and launch a client application.

When a user taps push notification content in step 1130, process 1100 may continue to step 1132 to determine if the device receiving the push notification is locked. For example, in step 1132 client device 150 may determine if the device is locked. If the push notification receiving device is locked (step 1132: yes), client device 150 may continue to step 1134 and request device-level authentication. For example, client devices 150 may request fingerprint, password, or face recognition identification in step 1134 and continue to step 1136 and launch a client application, such as client application 614 (FIG. 6). However, if the push notification receiving device is not locked (step 1132: no), client devices 150 may continue directly to step 1136 and launch the client application without requesting device-level authentication.

In step 1138, a user may log into the client application. For example, a user of client device 150, which received the push notification, may supply credentials to open the client application. In some embodiments, upon successful authentication, in step 1140 the push notification receiving device may display an authenticated experience. For example, client device 150 may display an authenticated experience in an application.

As shown in FIG. 11B, process 1100 may continue to step 1150 after displaying a waiting graphical user interface in step 1128. In step 1150, service system 105 or client devices 150 may determine if a client application, such as client application 614 (FIG. 6) has been initiated and proper authentication credentials have been entered. If the client application has not been initialized and the user has not been authorized (step 1150: no), process 1100 may continue to step 1158 and display an error graphical user interface. For example, in step 1158 client device 150 may display a graphical user interface described in connection with FIG. 14 H. However, if the client application has been initialized and the user has been authorized (step 1150: yes), process 1100 may continue to step 1152.

In step 1152, service system 105 or client devices 150 may determine if a user interacted within a threshold time with the push notification. If a user did not interact within a threshold time (step 1152: no), process 1100 may continue to step 1158 and display the error graphical user interface. However, if a user interacted within a threshold time (step 1152: yes), process 1100 may continue to step 1154.

In step 1154, service system 105 may determine if the first element of system 105, which transmitted the push notification, received a confirmation. If there is no confirmation from a user interaction (step 1154: no), process 1100 may continue to step 1158 and display the error graphical user interface. However, if the first element of system 105 received confirmation (step 1154: yes), process 1100 may continue to step 1156.

In step 1156, service system 105 may determine if there are additional results or more actions to be displayed. For example, service system 105 may determine whether, based on the push notification, there are more results or actions to display on client devices 150. If there are additional results or actions to be displayed (step 1156: yes), process 1100 may return to step 1112 to identify if the user expands the push notification. However, if there are not additional results or actions to be displayed (step 1156: no), process 1100 may continue to step 1160 and display an approved graphical user interface, such as the one described in connection to FIG. 14E.

From both steps 1158 (displaying an error interface) and step 1160 (displaying an approved interface) process 1100 may continue to step 1162 and dismiss the push notification.

Figure 12:
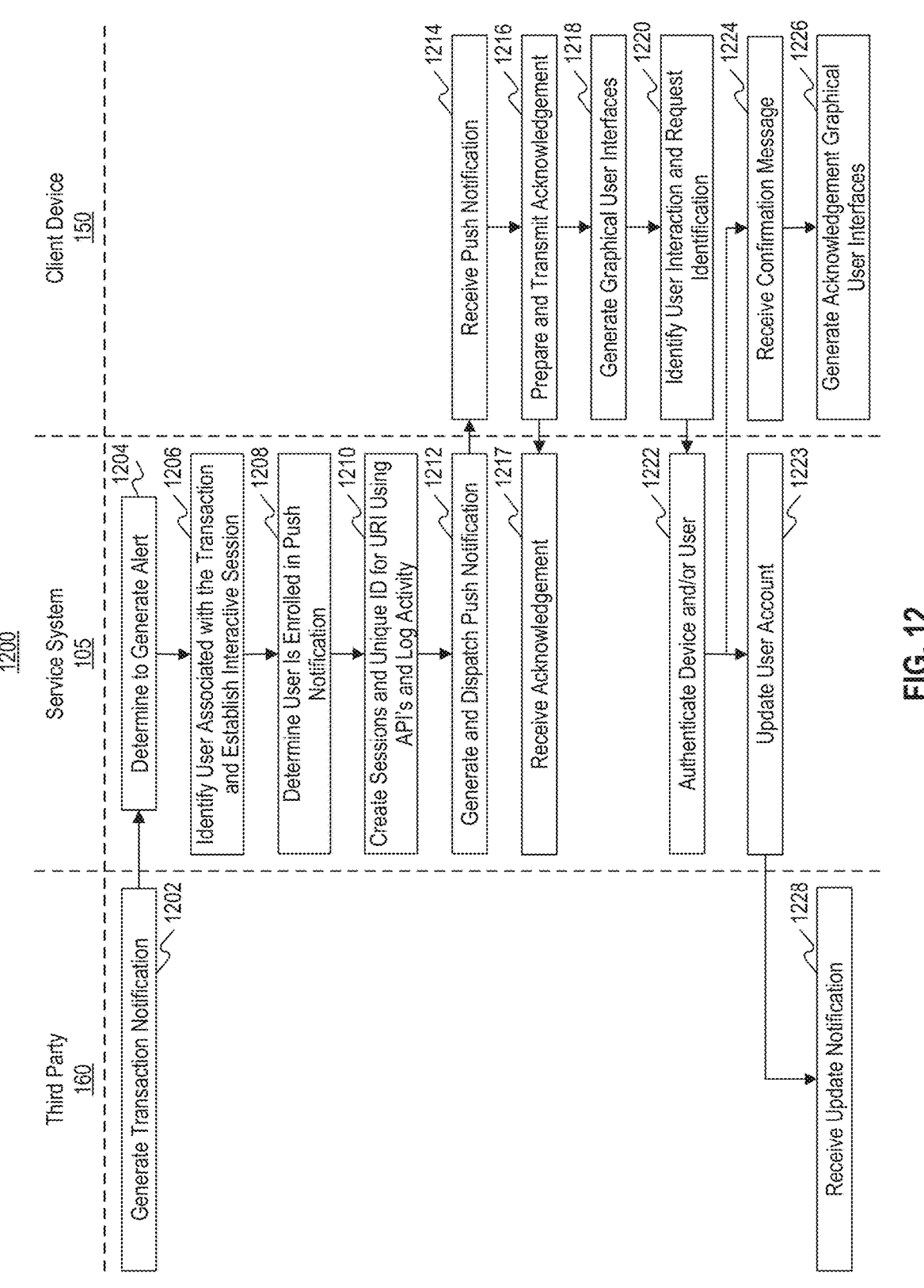
FIG. 12 is a flow diagram of an exemplary process for processing a transaction notification, consistent with disclosed embodiments

Referring now to FIG. 12, there is shown a process flow diagram for processing a transaction notification, consistent with disclosed embodiments. As shown in FIG. 12, process flow 1200 may be implemented between third-party systems 160, service system 105, and client devices 150. In other embodiments, however, additional elements of system 100 (FIG. 1) can be incorporated to process flow 1200. For example, online services 140 may perform some steps of process flow 1200. Further, in some embodiments process flow 1200 may be implemented only between service system 105 and client devices 150.

In step 1202, third-party systems 160 may generate a transaction notification and send it to service system 105. In some embodiments, the transaction notification may include a credit card authentication request or a notice that a credit card has been declined. The transaction notification may include information about the credit card, the user generating the notification, a transaction amount, and a merchant. In step 1204 service system 105 may receive the notification and determine whether or not to generate an alert, as further described in connection with step 805 (FIG. 8). When service system 105 decides to generate an alert, service system 105 may then identify a user associated with the transaction and establish an interactive session. For example, in step 1206 service system 105 may call session API module 234 to open a session that allows to retrieve and modify information from a user account.

Service system 105 may also create sessions and unique IDs for the payload of push notifications in step 1210. The unique ID may include information about an interactive session between service system 105 and other elements of system 100, such as client devices 150. The unique ID may encode information about one or more actions that would get executed once the user interacts with the interactive push notification. The actions may include, for example, unlocking a credit card, activating a credit card, making a payment without the physical card, and/or confirm a transaction. Moreover, in step 1210 service system may call different APIs to generate the URIs and may record activity of transactions and third-party systems 160 requests.

In step 1212 service system 105 may generate and dispatch a push notification, as previously described in connection with step 816 (FIG. 8), and transmit it to client devices 150. For example, service system 105 may use a dispatcher API to interact with message vendors such as APNS or GCM. The push notification may be received by client device 150 in step 1214, which may then prepare and transmit an acknowledgement of reception. For example, client application 614 in client device 150 may be configured to transmit a response to service system 105, which may then receive the acknowledgement in step 1217. In some embodiments, service system 105 may decide to maintain sessions open for updating the user account when receiving the acknowledgement.

Client device 150 may also generate graphical user interfaces in step 1218 that display information in of the push notification and interactive icons to collect the user response. Exemplary graphical user interfaces are described in connection with FIGS. 14A-14L. Some of the user interfaces of step 1218 may have interactive elements. For example, some of the user interfaces may include buttons with call-to-action functions associated with the URIs generated by service system 105. Alternatively, or additionally, interfaces of step 1218 may include slide bars, text boxes, dropdown menus, or other interactive icons that may capture a user response. In step 1220, client device 150 may determine whether the user of client device 150 has interacted with any of the interactive icons. For example, client device 150 may identify a user pressed a button. As discussed in connection with FIG. 9, client device 150 may request a device-level authentication and send an authentication request to service system 105. Service system 105 may receive the authentication request in step 1222 and determine whether client device 150 and the authentication is acceptable to complete the transaction.

Upon satisfactory authentication, service system 105 may continue to step 1223 and update the user account. For example, service system 105 may call one-click response API 236 and/or session API module 234 to interface with servers of system 100 or databases 180 that hold account information and perform the update requests based on the information from an URI action ID. Moreover, upon satisfactory authentication, service system 105 may send a confirmation message to client device, which client device may receive in step 1224 and process as described in connection with step 925 in FIG. 9.

In step 1226, client device 150 may generate graphical user interfaces to display the user an acknowledgement that the user account has been updated or that the transaction has been approved. Client device 150 may additionally display interfaces with recommendations and additional interactive buttons as described in connection with FIG. 14F. In some embodiments, third-party systems 160 may be notified that the push notification has been processed and inform and third-party systems 160 may receive an update notification. In step 1228 third-party system 160 may receive the update notification resolving the issues that were raised in step 1202. For example, if the transaction notification in step 1202 indicates that the credit card was locked, in step 1228 third-party systems 160 may receive an updated notification from service system 105 indicating the credit card was unlocked.

Figure 13:
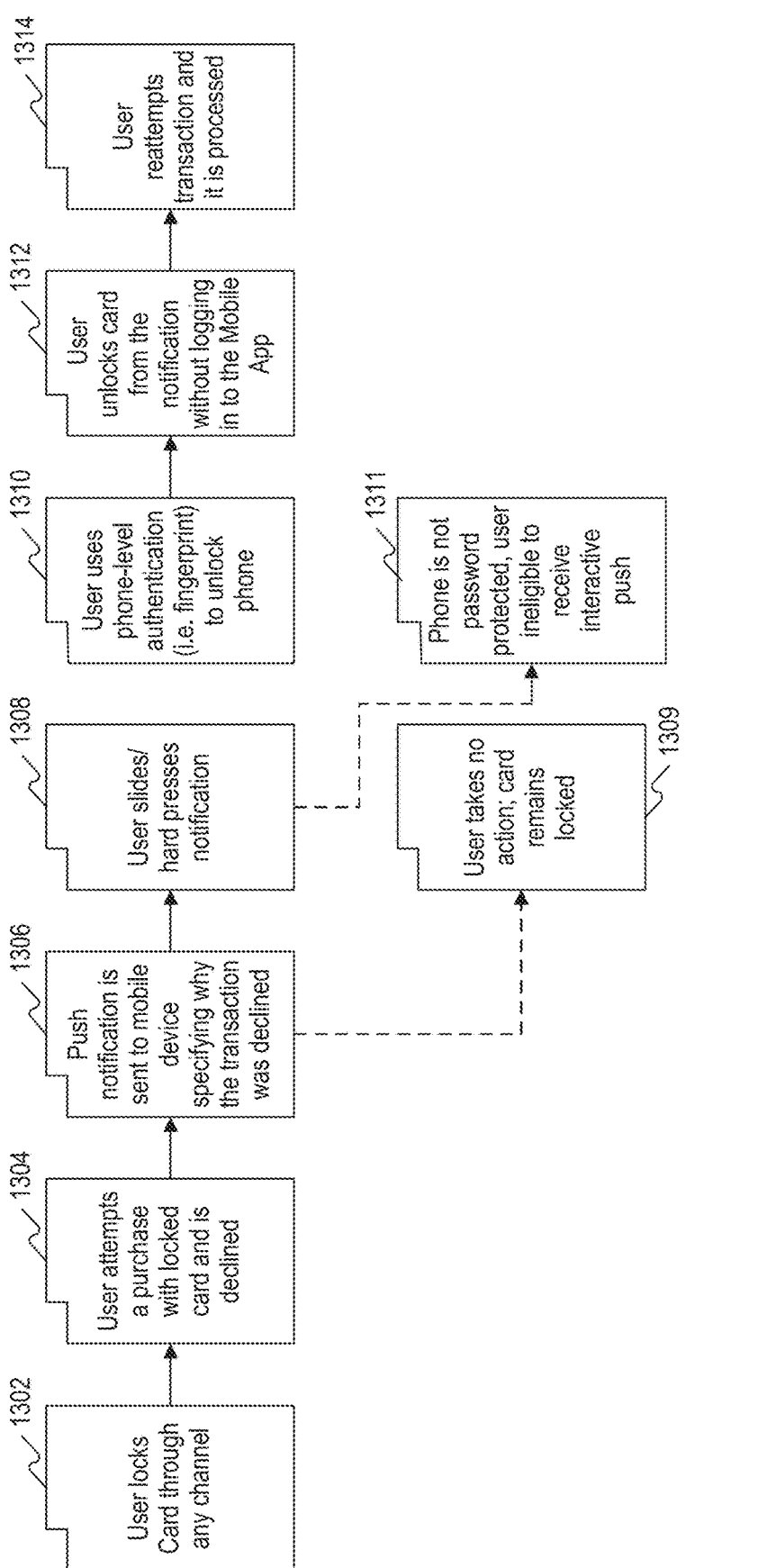
FIG. 13 is a process flow diagram of an exemplary declined card transaction, consistent with disclosed embodiments

FIG. 13 shows an exemplary process flow diagram for a declined card transaction, consistent with disclosed embodiments. Declined card flow 1300 describes an exemplary implementation of system 100 related to unlocking a credit card using push notifications. However, additional implementations such as activating a new card, confirming a transaction, or performing a transaction without the physical card, may also be implemented in system 100.

Declined card flow 1300 may start in step 1302, in which a user locks a credit card through one of the available channels. For example, a user may call an agent of service system 105 to lock a card. Alternatively, or additionally, a user may use a web interface or a mobile application to lock the card. Then databases 180 or transaction memory 220 may update the records of the user's account to reflect the user has locked the credit card.

In step 1304, although the user blocked the card in step 1302, the user may attempt to perform a transaction with the locked card. During exchanges between the point-of-sale and the acquirer bank for transaction authorization, the bank would decline the transaction because the user had locked the card. Accordingly, in step 1304 the transaction may be declined.

In response to a notification that the credit card was declined, service system 105 may generate and transmit an interactive push notification to a mobile device associated with the user in step 1306. The interactive push notification may include a payload, as described in connection with FIG. 8 and further described in connection with FIG. 15, with interactive elements and may specify the reason why the attempted transaction was declined. For example, service system 105 may generate and send an interactive push notification that explains the transaction was declined because the user had previously locked the credit card.

In response to the push notification being displayed in the client device, user may choose to not interact with the push notification. Then in step 1309, the user takes no action and the card remains locked. For example, a timer in service system 105 may expire, no changes are performed in the user account, and the credit card remains locked. However, when the user interacts with the push notification in step 1308 (i.e., slides or hard-presses the push notification), declined card flow 1300 may continue to step 1310 in which the user uses device-level authentication, such as a password, a fingerprint, or a face recognition to unlock the phone and authenticate the user. Nonetheless, if there is no password protection in the user device, in step 1311 the user device may only show the push notification without displaying the interactive options. To prevent unauthenticated changes in user accounts, users with devices that do not have device-level protection, or have a password that is too unreliable, may be ineligible to receive the interactive push notifications.

In step 1312, service system 105 may process the user request via the push notification to unlock the card. Within the push notification itself and using a call-to-action defined by a URI, the user can provide instructions to service system 105 to unlock the card without having to authenticate in the mobile app. With this arrangement, the user may be able to quickly unlock the card with no effort of having to launch the application and perform additional authorization steps in different channels. This simplified communication medium via push notification solves issues of allocation of resources because it reduces the number of interactions between users and agents to unlock credit cards. In some embodiments, once service system 105 processes the transaction, client device 150 may notify the user that the credit card was unlocked. In step 1314 the user may reattempt the transaction as usual. Now that the user account has been updated to unlock the account, the transaction may be processed as usual finalizing declined card flow 1300.

FIGS. 14A-14L shows exemplary graphical user interfaces (GUIs) that may be displayed on client devices 150. In some embodiments, client devices 150 may display one or more of the GUIs when receiving a push notification from service system 105. In such embodiments, GUIs may be prepared by client application 614 or other programs 612 in client devices 150. In such embodiments, client applications 614 may display the GUIs in different sequences based on the user interaction with the push notification and responses from service system 105.

Figure 14A:
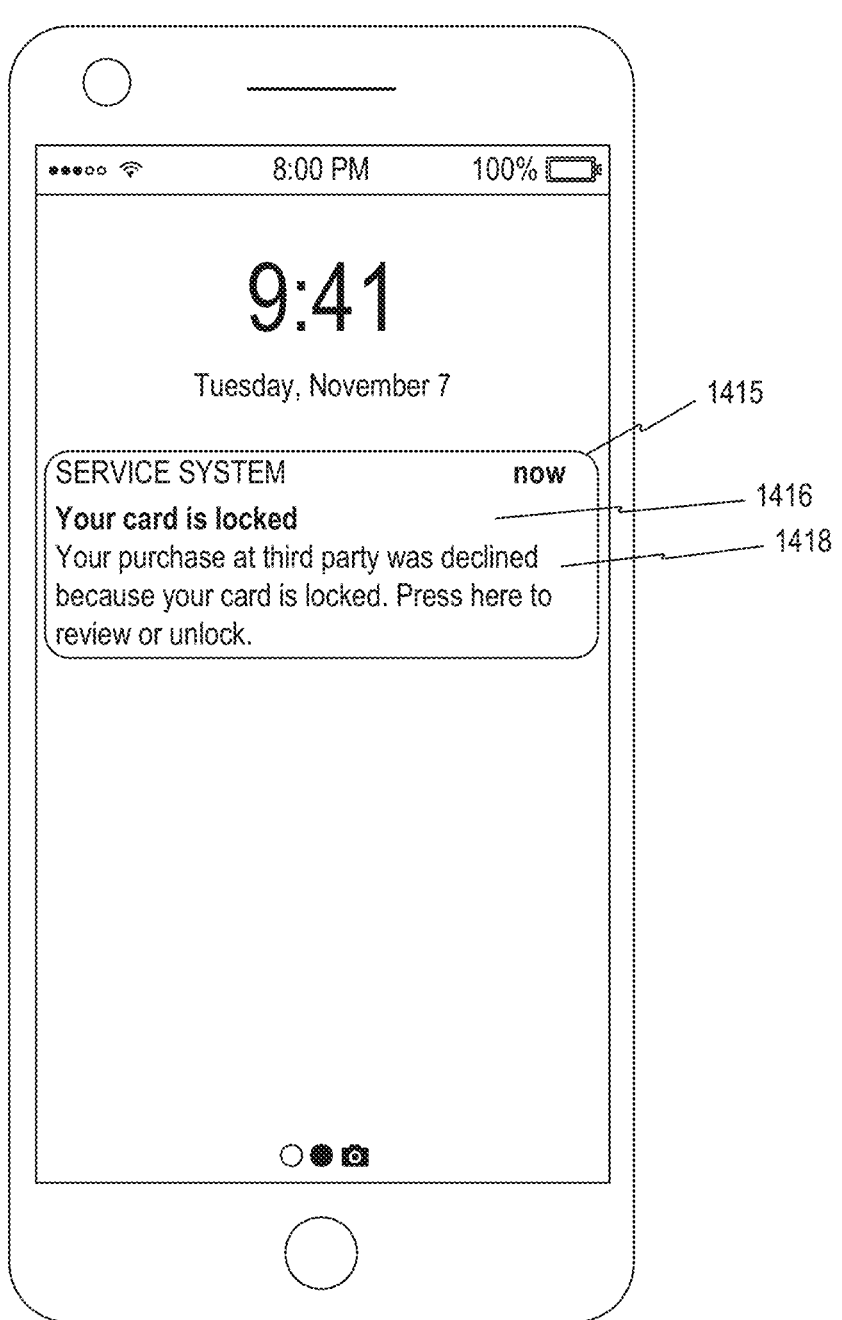
FIG. 14A is a front view of a first exemplary graphical user interface in a mobile device, consistent with disclosed embodiments.
Figure 14B:
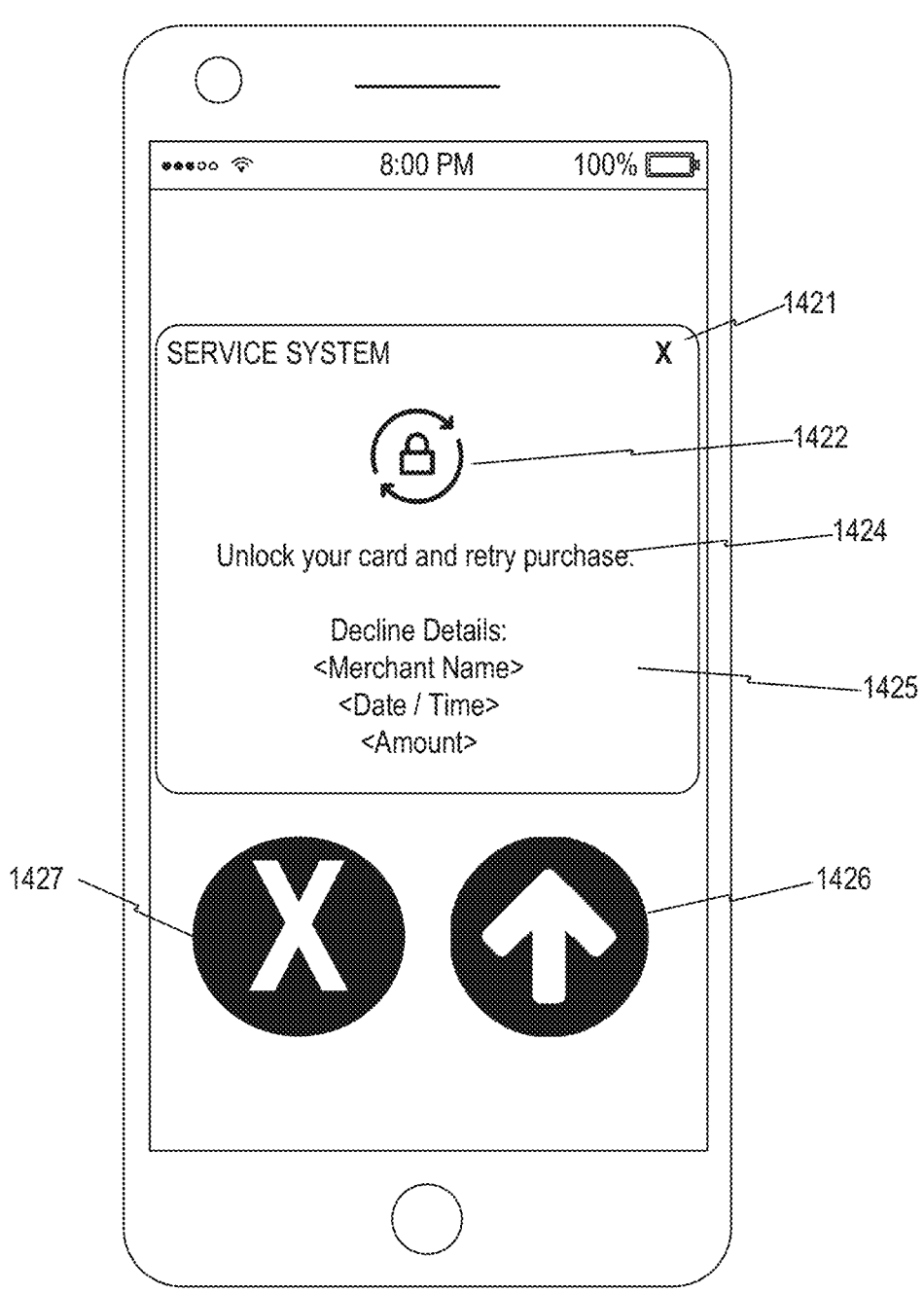
FIG. 14B is a front view of a second exemplary graphical user interface in a mobile device, consistent with disclosed embodiments.

FIG. 14A shows a first GUI 1410 that includes a notification box 1415. Notification box 1415 may be generated when a push notification is received by client devices 150. Notification box 1415 may include a title 1416 and a message 1418 and may be displayed as an interruption in client devices 150 when receiving a push notification. In some embodiments, when a user interacts with notification box 1415, client devices may generate a second GUI 1420 as shown in FIG. 14B, which includes a message box 1422 and an affirmative response button 1426 and a negative response button 1347. Message box 1422, affirmative response button 1426, and negative response button 1427 may be displayed based on instructions in the payload of the push notification. Although not shown in FIG. 14B, in some embodiments affirmative response button 1426, and negative response button 1427 may include messages. For example, affirmative response button 1426 may include an "unlock now message" and negative response button may include a "keep locked message." Message box 1422 may include a lock icon 1423, a notification description 1424, and a specific reasons message 1425. As shown in FIG. 14B, in some embodiments specific reasons message may include merchant, date, and amount information. In some embodiments, notification description 1424 may be equal to title 1416. Response button 1426 may have a call-to-action specified by a URI generated by service system 105, as described in connection with FIG. 8.

Figure 14C:
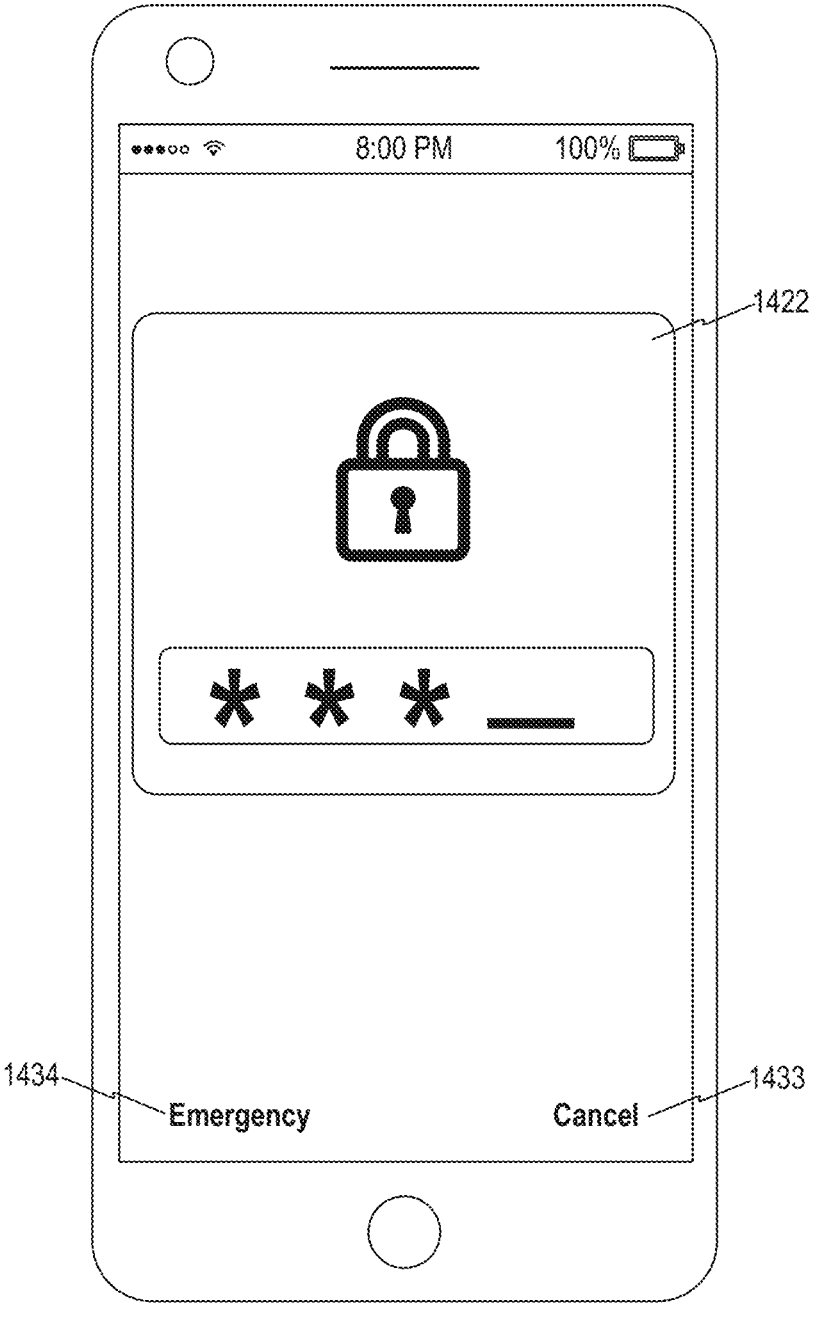
FIG. 14C is a front view of a third exemplary graphical user interface in a mobile device, consistent with disclosed embodiments.

In some embodiments, when a user interacts or selects response button 1426, client devices may generate a third GUI 1430, as shown in FIG. 14C. Third GUI 1430 may be used to request authentication of the user before transmitting instructions to service system 105. Third GUI 1430 may include an unlock icon 1432. Third GUI 1430 may also include a cancel button 1433 that a user may select when it wants to cancel the authentication. Third GUI 1430 may also include emergency button 1434, which the user may select when the user cannot perform the authentication but wants to perform the operation regardless. In some embodiments, selecting emergency button 1434 may open a line of communication with agents of service system 105. For example, client device 150 may be configured to call an agent when a user interacts with emergency button 1434.

Figure 14D:
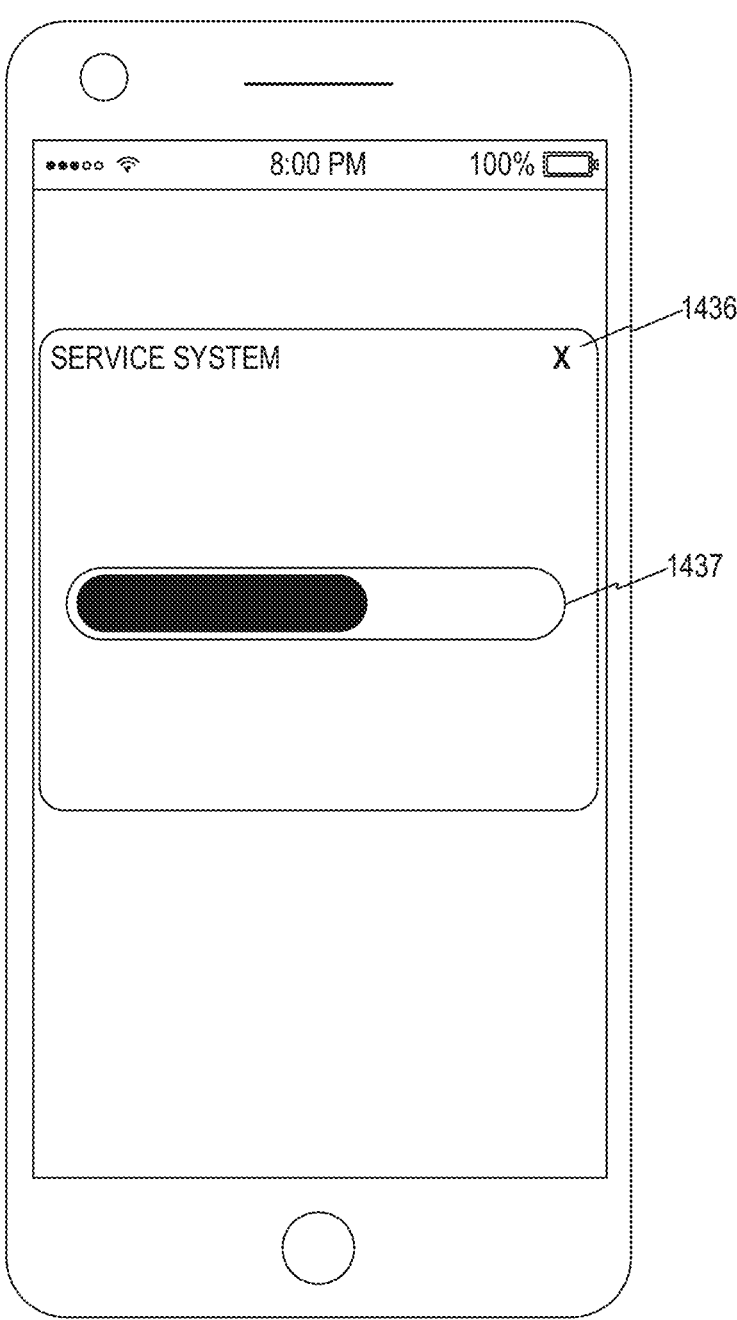
FIG. 14D is a front view a fourth exemplary graphical user interface in a mobile device, consistent with disclosed embodiments.

A fourth GUI 1435, as shown in FIG. 14D, may be displayed when a user authenticates and overcomes third GUI 1430. Fourth GUI 1435 may include a processing window 1436 and a processing icon 1437. Fourth GUI 1435 may be displayed until a confirmation of successful transaction is received by client devices 150.

Figure 14E:
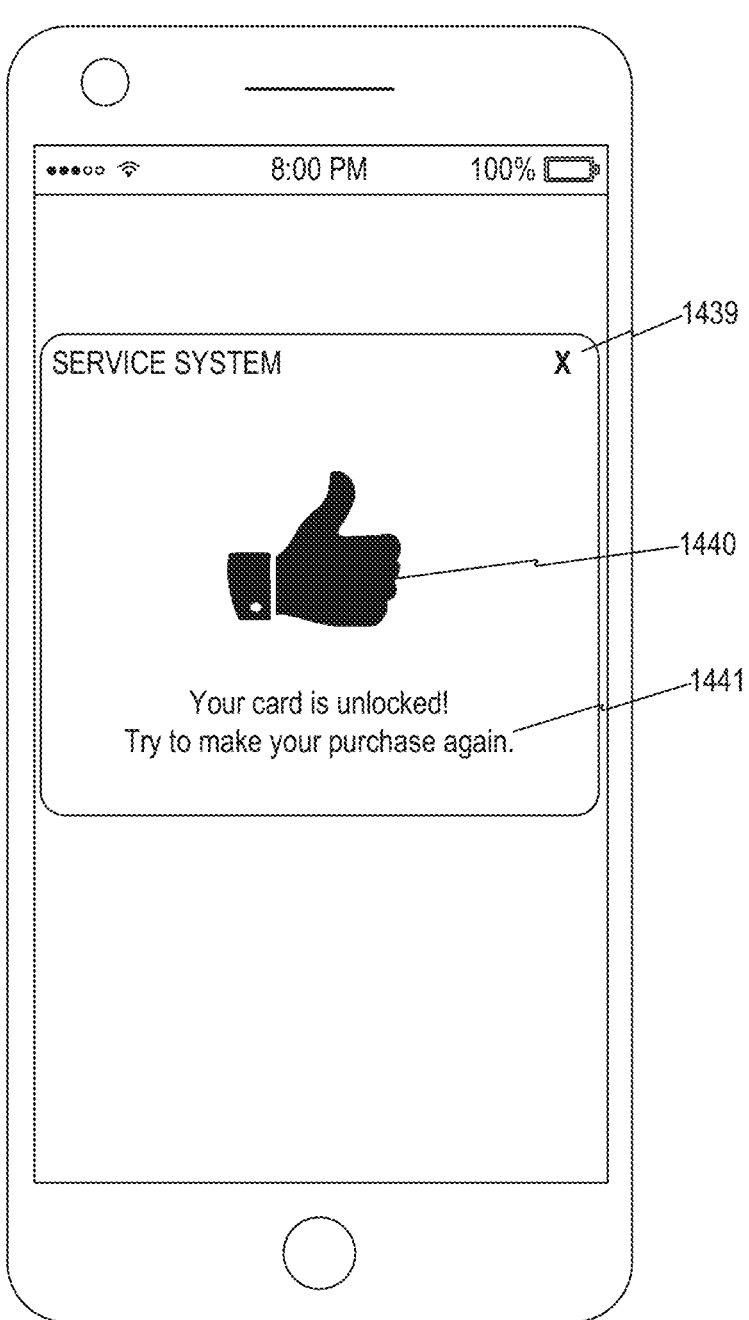
FIG. 14E is a front view of a fifth exemplary graphical user interface in a mobile device, consistent with disclosed embodiments.

When the confirmation is received, client devices 150 may display a fifth GUI 1438, as shown in FIG. 14E, which may include a confirmation window 1439 including a confirmation icon 1440 and a confirmation message 1441.

The five GUIs as described in FIGS. 14A-14E may be displayed in sequence as the user makes selections and a confirmation is received from service system 105. For example, first GUI 1410 may be followed by second GUI 1420 when a user selects the notification, which may be followed by third GUI 1430 when a user selects response button 1426, which may be followed by fourth GUI 1435 when a user provides authentication credentials, which may be followed by fifth GUI 1438 when a confirmation is received. However, in other embodiments, alternative sequences may be displayed depending on the user interaction.

Figure 14F:
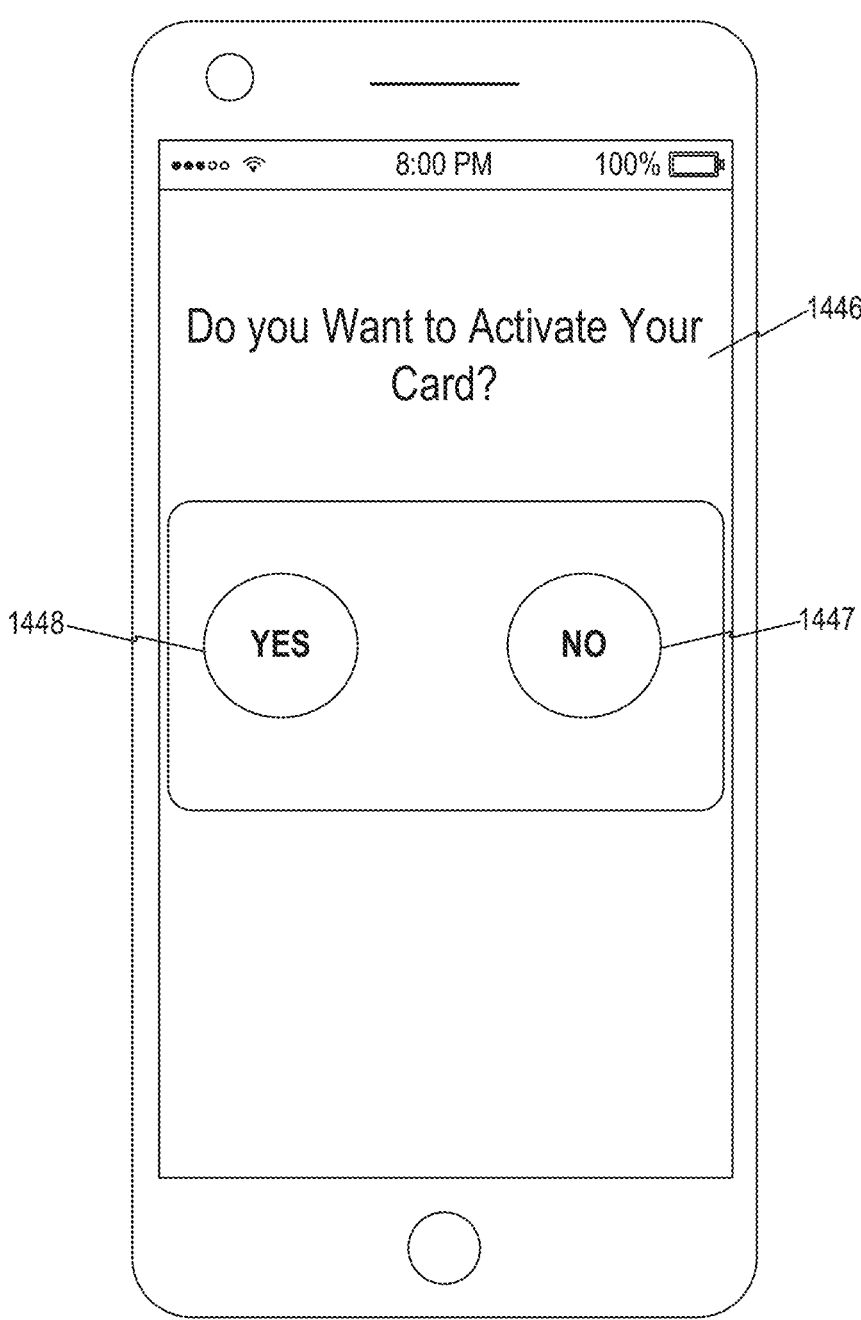
FIG. 14F is a front view of a sixth exemplary graphical user interface in a mobile device, consistent with disclosed embodiments.

FIG. 14F shows a sixth GUI 1445 that includes two response buttons instead of a single response button. Sixth GUI 1445 includes a first response button 1448 and a second response button 1447. Each one of first response button 1448 and second response button 1447 may have an independent call-to-action associated with a specific URI. Further, sixth GUI 1445 may include a title 1446.

Figure 14G:
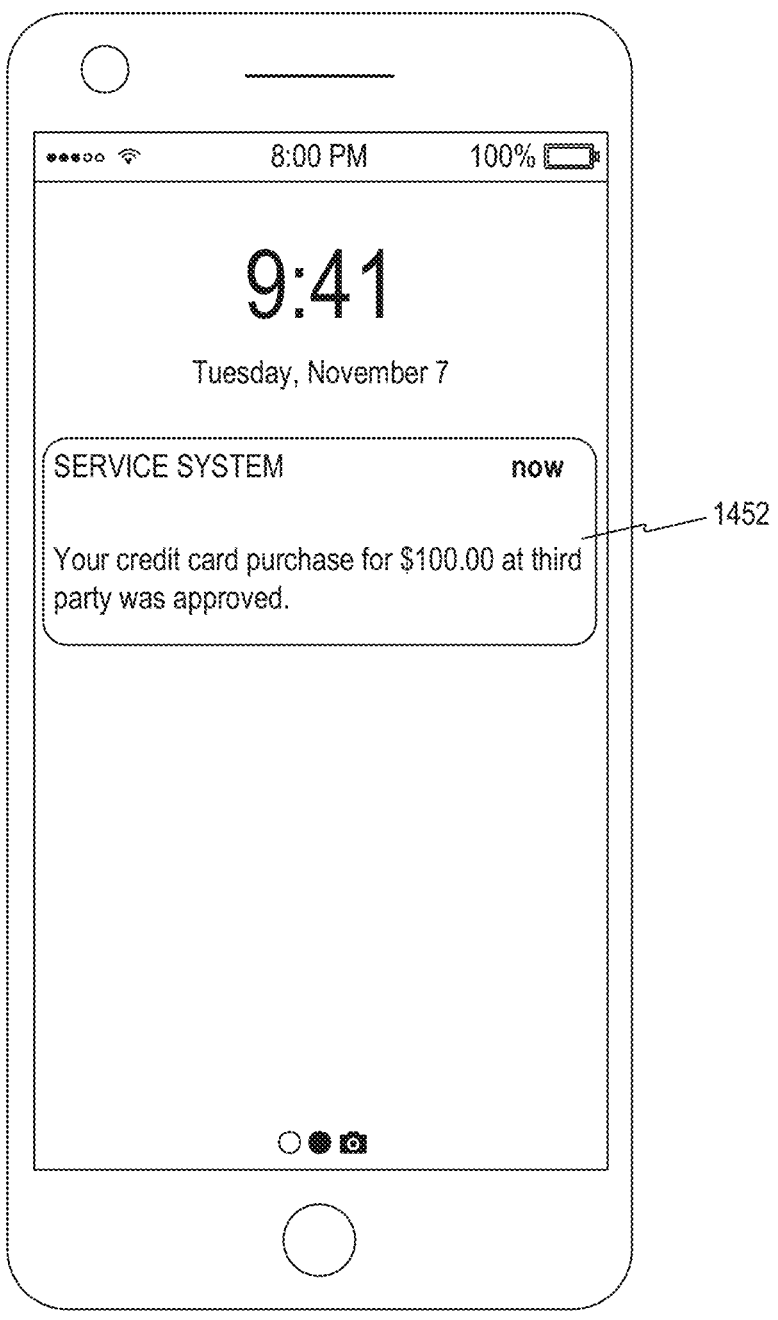
FIG. 14G is a front view of a seventh exemplary graphical user interface in a mobile device, consistent with disclosed embodiments.

FIG. 14G shows a seventh GUI 1450 that may be displayed when client devices receive a second push notification. For example, after unlocking a credit card and reattempting a transaction, client devices 150 may generate seventh GUI 1450 when it receives a second push notification informing the user that the transaction was successful. Seventh GUI 1450 may include a second notification box 1451 including a message 1452, which may include details of the transaction such as the merchant and/or transaction amount.

Figure 14H:
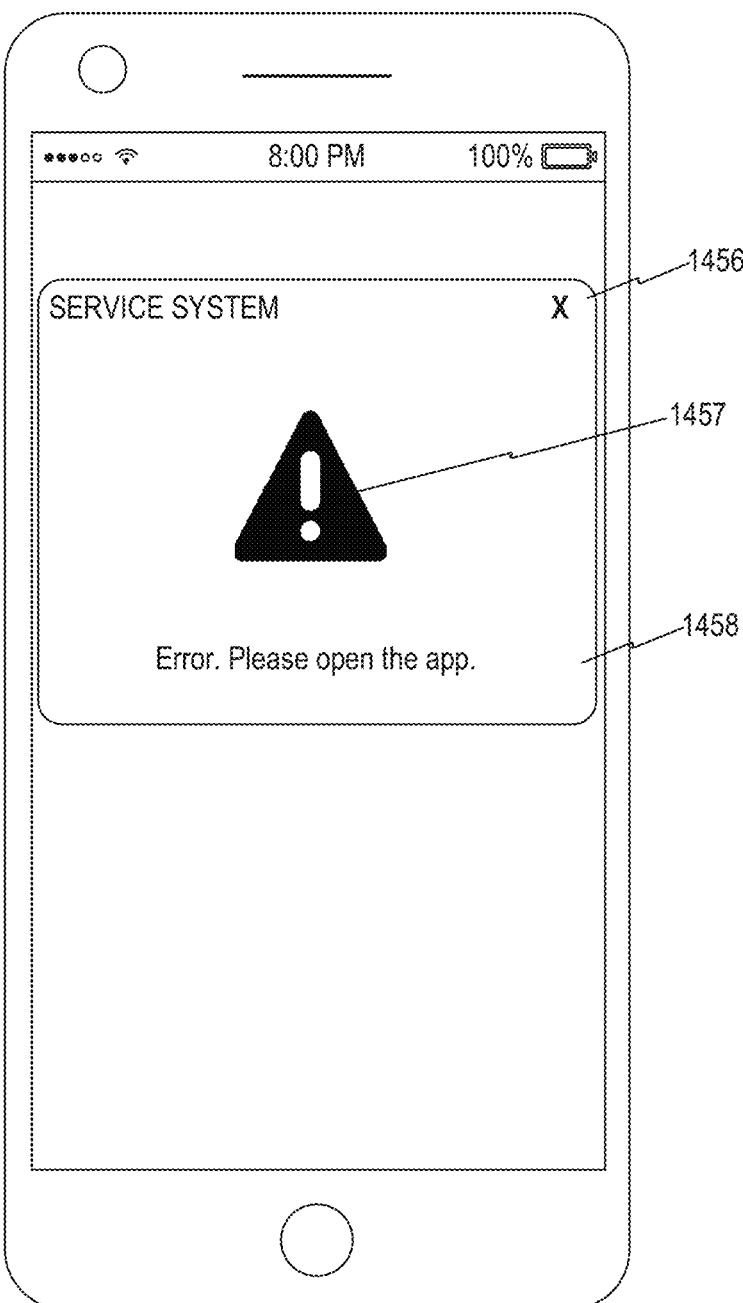
FIG. 14H is a front view of an eighth exemplary graphical user interface in a mobile device, consistent with disclosed embodiments.

FIG. 14H shows an eight GUI 1455 which may be displayed when client devices 150 determines there is an error in the push notification process. For example, when a user provides incorrect credentials, client devices 150 may display eight GUI 1455. Alternatively, or additionally, when a confirmation is not received from service system 105, client devices 150 may display eighth GUI 1455. Further, when a client device does not include device-level authentication and the interactive push notification cannot be displayed, client devices 150 may display eighth GUI 1455. Eighth GUI 1455 may include an error window 1456, which may include an error icon 1457 and an error message 1458.

Figure 14I:
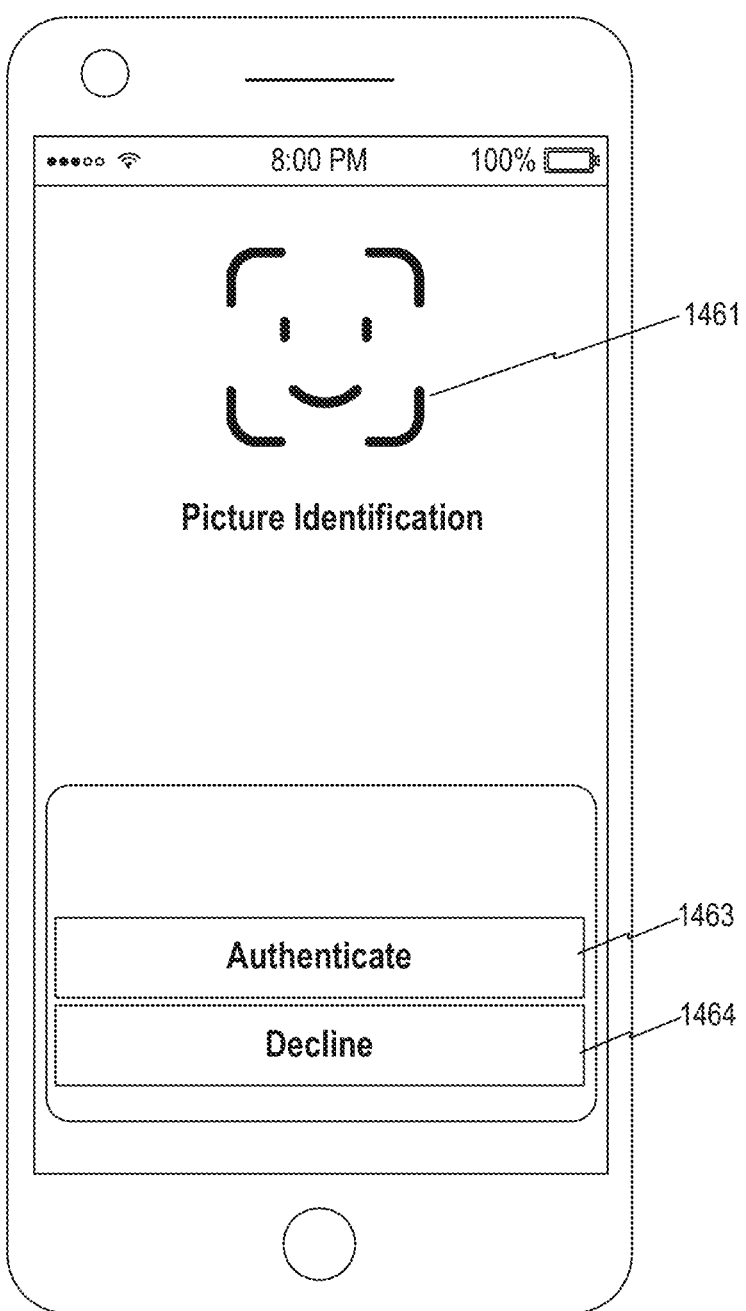
FIG. 14I is a front view of a ninth exemplary graphical user interface in a mobile device, consistent with disclosed embodiments.
Figure 14J:
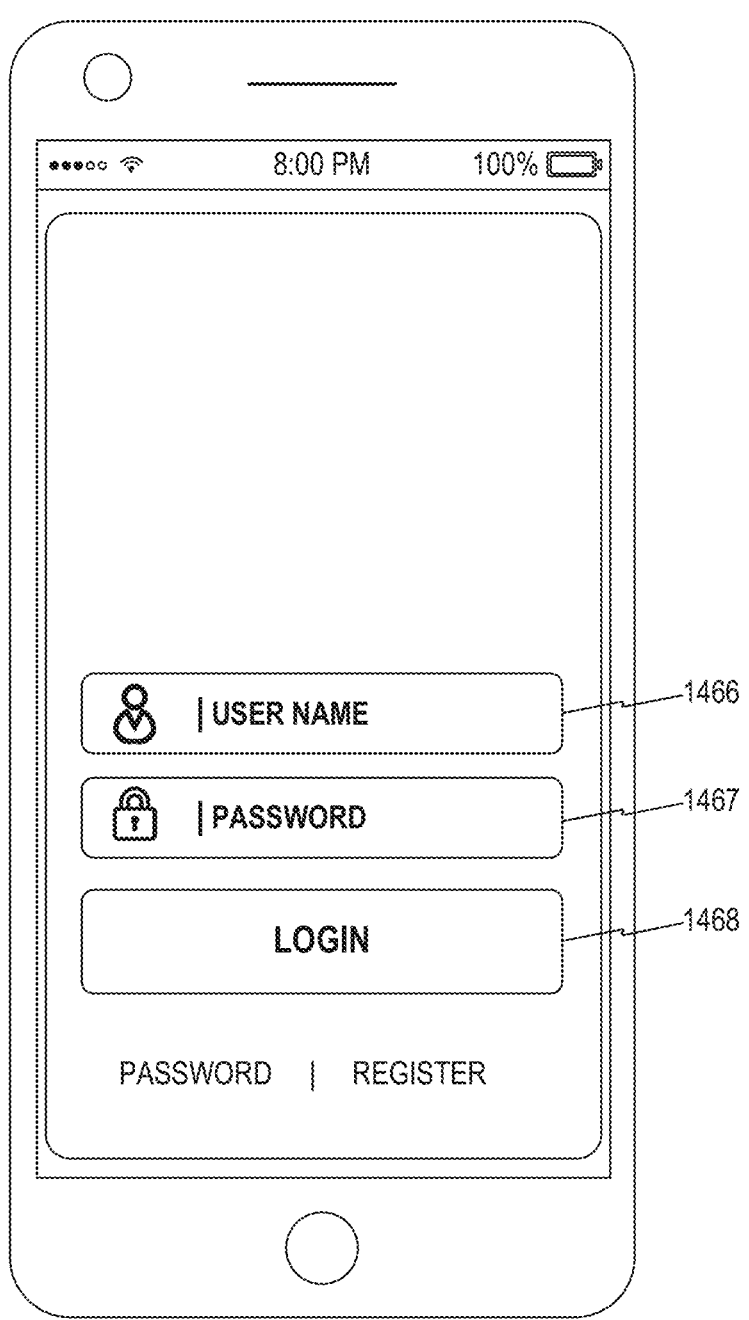
FIG. 14J is a front view of a tenth exemplary graphical user interface in a mobile device, consistent with disclosed embodiments.

As described in connection with FIG. 9, in some embodiments, client devices 150 may choose to launch an application when there are issues with the push notification. For example, when the issue cannot be resolved within the push notification, client devices 150 may be configured to launch client application 614. In such embodiments, client devices 150 may display a ninth GUI 1460, as shown in FIG. 14I, and/or tenth GUI 1465, as shown in FIG. 14J, to authenticate a user and grant access to the mobile application. Ninth GUI 1460 may include an authentication icon 1461, an authenticate button 1463, and a decline button 1464. Tenth GUI 1465 may include a user name textbox 1466, a password textbox 1467, and a login button 1468.

Figure 14K:
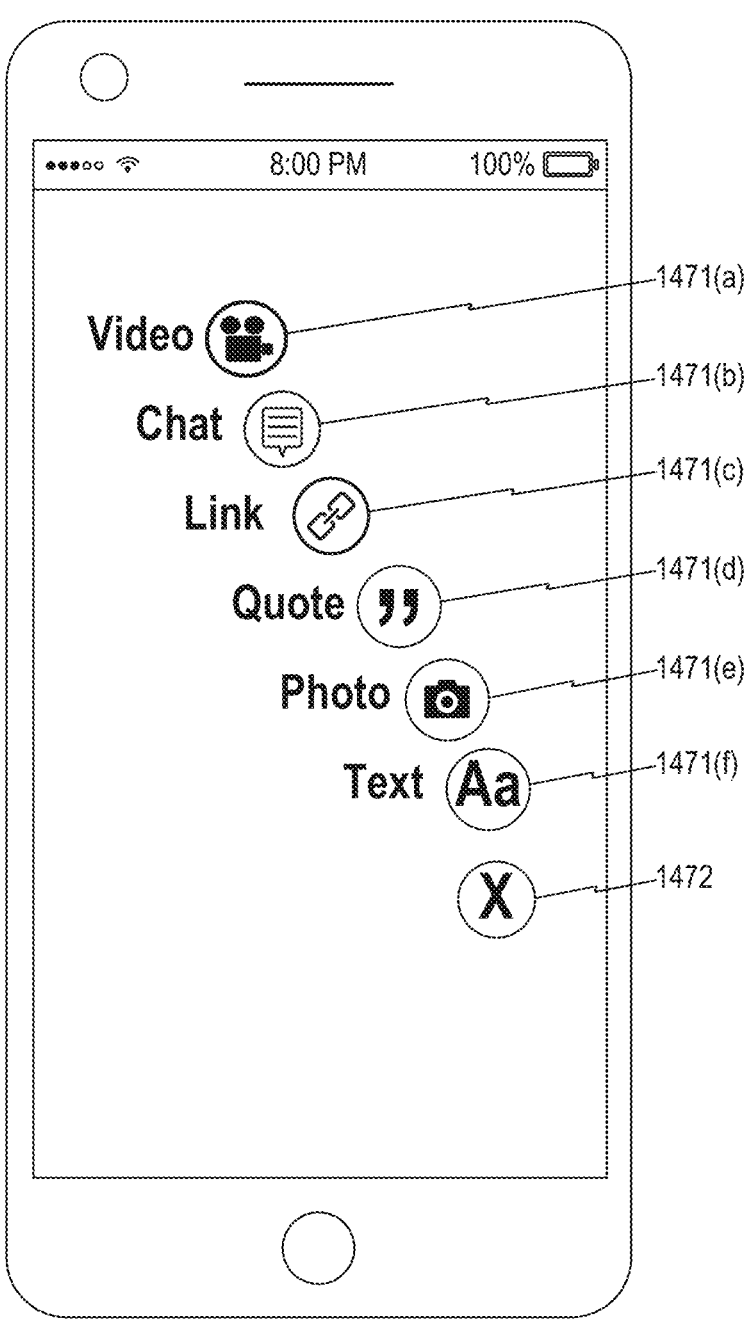
FIG. 14K is a front view of an eleventh exemplary graphical user interface in a mobile device, consistent with disclosed embodiments.

Once authenticated, client devices 150 may be configured to display an eleventh GUI 1470 for the client application 614, as shown in FIG. 14K. Eleventh GUI 1470 may include a plurality of action icons 1471($a$)-1471($f$), and a close icon 1472.

Figure 14L:
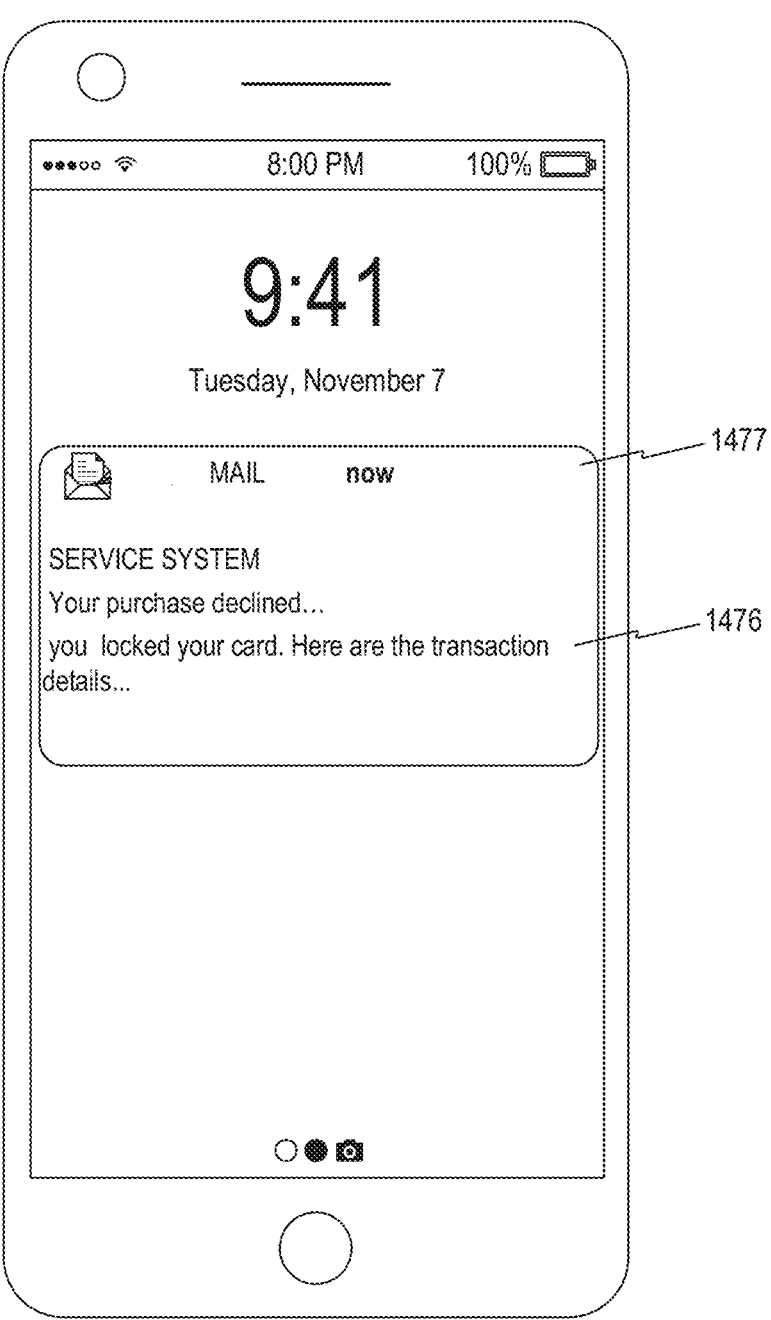
FIG. 14L is a front view of a twelfth exemplary graphical user interface in a mobile device, consistent with disclosed embodiments.

In some embodiments, when push notifications are not enabled, service system 105 may choose to attempt obtaining user instructions with other methods such as SMS or emails, as described in connection with steps 824 and 826 (FIG. 8). In such embodiments, client devices 150 may display twelfth GUI 1475, as shown in FIG. 14L, when a push notification cannot be delivered to client devices. Twelfth GUI 1475 may include an email box 1477 and an email message 1476. In other embodiments, twelfth GUI 1475 may display the same two elements but for an SMS.

Referring now to FIG. 15, there is shown a graphical user interface listing exemplary source code for generating a push notification payload, consistent with disclosed embodiments. Listing 1500 shows source code for a push notification payload including alert instructions 1505 for generating an alert message, interactive instructions 1510 for generating interactive elements, and parameters instructions 1515 specifying notification parameters. Alert instructions 1505 may include instructions to display an alert message, such as the one described in connection with FIG. 14A. Interactive instructions 1510 may include instructions to display an interactive icon 1511, an identifier of the interactive icon 1512, and a resource identifier 1514 associated with a call-to-action of interactive icon 1511. Resource identifier 1514 may include a file path, and may encode a message ID 1514(*a*), which may include information about the user, a content ID 1514(*b*) including instructions for an API to execute instructions, an error template ID 1514(*c*) including instructions for interactive icon 1511 when there is a mistake in the process, and an action request ID 1514(*d*), which may encode instructions for one-click updating operation of the user account.

Parameters instructions 1515 may include information about the push notification and its expected behavior, including an action link, the characteristics of the display, and detailed text, among other parameters.

Another aspect of the disclosure is directed to a non-transitory computer-readable medium storing instructions that, when executed, cause one or more processors to perform the methods, as discussed above. The computer-readable medium may include volatile or non-volatile, magnetic, semiconductor, tape, optical, removable, non-removable, or other types of computer-readable medium or computer-readable storage devices. For example, the computer-readable medium may be the storage unit or the memory module having the computer instructions stored thereon, as disclosed. In some embodiments, the computer-readable medium may be a disc or a flash drive having the computer instructions stored thereon.

It will be apparent to those skilled in the art that various modifications and variations can be made to the disclosed system and related methods. Other embodiments will be apparent to those skilled in the art from consideration of the specification and practice of the disclosed system and related methods. It is intended that the specification and examples be considered as exemplary only, with a true scope being indicated by the following claims and their equivalents.

Moreover, while illustrative embodiments have been described herein, the scope thereof includes any and all embodiments having equivalent elements, modifications, omissions, combinations (e.g., of aspects across various embodiments), adaptations and/or alterations as would be appreciated by those in the art based on the present disclosure. For example, the number and orientation of components shown in the exemplary systems may be modified. Further, with respect to the exemplary methods illustrated in the attached drawings, the order and sequence of steps may be modified, and steps may be added or deleted.

Thus, the foregoing description has been presented for purposes of illustration only. It is not exhaustive and is not limiting to the precise forms or embodiments disclosed. Modifications and adaptations will be apparent to those skilled in the art from consideration of the specification and practice of the disclosed embodiments.

The claims are to be interpreted broadly based on the language employed in the claims and not limited to examples described in the present specification, which examples are to be construed as non-exclusive. Further, the steps of the disclosed methods may be modified in any manner, including by reordering steps and/or inserting or deleting steps.

What is claimed is:

1. A client computing device of a user for providing responses by the user to time-sensitive push notifications in connection with users attempting to complete a transaction, comprising:
one or more processors that, in response to executing computer program instructions, are configured to:
receive, from a server, a push notification with a payload, the payload comprising:

an instruction to display a first graphical user interface (GUI) comprising an alert and an interactive icon, wherein the alert comprises alert information relating to the transaction and a first message indicating the transaction is affected by a status of an account of the user, and wherein the interactive icon comprises a response element for confirming proceeding to approve the transaction; and
a uniform resource identifier associated with the interactive icon, wherein the uniform resource identifier comprises an action ID encoding a one-click response API call to communicate with a database and to update a user account, wherein the action ID indicates an action to perform with respect to the user account, and wherein the action ID indicates a transaction approval action;
cause the first GUI comprising the alert and the interactive icon to be displayed via the client computing device;
detect, via the first GUI, an interaction with the interactive icon confirming proceeding to approve the transaction;
request, via a second GUI, that device-level authentication be performed;
generate and transmit, to the server, an electronic message comprising the uniform resource identifier that comprises the action ID, the electronic message indicating that the device-level authentication has been provided based on the interaction with the interactive icon being detected via the second GUI; and
in response to receiving, based on the electronic message, a confirmation message indicating that the uniform resource identifier has been accepted, cause a third GUI to be displayed via the client computing device, the third GUI indicating that the transaction was approved based on database records of the user account being updated, the database records being updated based on the action ID.

2. The client computing device of claim 1, wherein a single communication channel is used to update the database records by processing the electronic message.

3. The client computing device of claim 1, wherein the payload further comprises one or more instructions to display a fourth GUI comprising information identifying a merchant associated with the transaction.

4. The client computing device of claim 1, wherein:
the response element is a response button; and
the uniform resource identifier defines a call-to-action of the response button.

5. The client computing device of claim 1 wherein the push notification comprises a one-click response API call.

6. The client computing device of claim 5, wherein the one-click response API call:
configures directory paths comprising query parameters; and
returns a cookie ID in an HTTP response header.

7. The client computing device of claim 5, wherein the one-click response API call generates a web URL for a one-click interaction, the web URL encoding a customized interaction-specific web page.

8. The client computing device of claim 5, wherein the one-click response API call generates at least one of scripts or microdata routines to execute actions encoded in the action ID.

9. The client computing device of claim 1, wherein the one or more processors are further configured to:

determine that the push notification includes an error; and generate and cause a fourth GUI to be displayed comprising an error icon and an error message.

10. The client computing device of claim 1, wherein the one or more processors are further configured to:

responsive to detecting an error with the push notification, cause an application associated with the server to be launched.

11. The client computing device of claim 10, wherein launch of the application comprises the one or more processors being configured to:

cause a fourth GUI to be displayed via the client computing device to provide authentication for accessing to the application.

12. The client computing device of claim 1, wherein the one or more processors are further configured to:

responsive to determining that push notifications are disabled, receive a message comprising at least some of the payload.

13. The client computing device of claim 1, wherein identifying information is input to the client computing device for providing the device-level authentication.

14. The client computing device of claim 13, wherein identifying information comprise biometric information.

15. The client computing device of claim 1, wherein the payload further comprises custom keys to deliver data to the client computing device, notify server app extensions, or notify content app extensions.

16. The client computing device of claim 1, wherein the one or more processors are further configured to:

encrypt the electronic message prior to transmitting the electronic message to the server.

17. The client computing device of claim 1, wherein the alert information indicates that the transaction is declined based on the user account being locked.

18. The client computing device of claim 1, wherein the push notification is received from an edge server located geographically proximate the client computing device.

19. A method for providing responses to time-sensitive notifications in connection with users attempting to complete a transaction, the method comprising:

receiving, from a server, at a client computing device, an electronic notification with a payload comprising:

an instruction to display a first graphical user interface (GUI) comprising an alert and an interactive icon, wherein the alert comprises alert information relating to the transaction and a first message indicating the transaction is affected by a status of an account of a user, and wherein the interactive icon comprises a response element for confirming proceeding to approve the transaction; and a uniform resource identifier associated with the interactive icon, wherein the uniform resource identifier comprises an action ID encoding a one-click response API call to communicate with a database and to update a user account, wherein the action ID indicates an action to perform with respect to the user account, and wherein the action ID indicates a transaction approval action;

causing the first GUI comprising the alert and the interactive icon to be displayed via the client computing device;

detecting, via the first GUL, an interaction with the interactive icon confirming proceeding to approve the transaction;

requesting, via a second GUI, that device-level authentication be performed;

generating and transmitting, to the server, an electronic message comprising the uniform resource identifier that comprises the action ID, the electronic message indicating that the device-level authentication has been provided based on the interaction with the interactive icon being detected via the second GUI;

receiving, at the client computing device, based on the electronic message, a confirmation message indicating that the uniform resource identifier has been accepted; and causing a third GUI to be displayed via the client computing device, the third GUI indicating that the transaction was approved based on database records of the user account being updated, the database records being updated based on the action ID.

20. One or more non-transitory computer-readable media storing computer program instructions that, when executed by one or more processors, effectuate operations comprising:

receiving, from a server, at a client computing device, an electronic notification with a payload comprising:

an instruction to display a first graphical user interface (GUI) comprising an alert and an interactive icon, wherein the alert comprises alert information relating to a transaction and a first message indicating the transaction is affected by a status of an account of a user, and wherein the interactive icon comprises a response element for confirming proceeding to approve the transaction; and a uniform resource identifier associated with the interactive icon, wherein the uniform resource identifier comprises an action ID encoding a one-click response API call to communicate with a database and to update a user account, wherein the action ID indicates an action to perform with respect to the user account, and wherein the action ID indicates a transaction approval action;

causing the first GUI comprising the alert and the interactive icon to be displayed via the client computing device;

detecting, via the first GUI, an interaction with the interactive icon confirming proceeding to approve the transaction;

requesting, via a second GUI, that device-level authentication be performed;

transmitting, to the server, an electronic message comprising the uniform resource identifier that comprises the action ID, the electronic message indicating that device level authentication has been provided based on the interaction with the interactive icon being detected via the second GUI;

receiving, at the client computing device, based on the electronic message, a confirmation message indicating that the uniform resource identifier has been accepted; and causing a third GUI to be displayed via the client computing device, the third GUI indicating that the transaction was approved based on database records of the user account being updated, the database records being updated based on the action ID.

* * * * *